(12) United States Patent
Fu et al.

(10) Patent No.: US 9,679,010 B2
(45) Date of Patent: Jun. 13, 2017

(54) METHODS, SYSTEMS, AND APPARATUS FOR SEARCH OF ELECTRONIC INFORMATION ATTACHMENTS

(71) Applicants: Song Fu, Chengdu (CN); Xun Lin, Baden-Wurttemberg (DE); Gui Zhou Li, Chengdu (CN); Ke Li, Chengdu (CN); Ming Huang, Chengdu (CN); Jian Jun Xia, Chengdu (CN); Hong Li, Chengdu (CN); Bei Ning Li, Chengdu (CN); Li Hui Wu, Chengdu (CN)

(72) Inventors: Song Fu, Chengdu (CN); Xun Lin, Baden-Wurttemberg (DE); Gui Zhou Li, Chengdu (CN); Ke Li, Chengdu (CN); Ming Huang, Chengdu (CN); Jian Jun Xia, Chengdu (CN); Hong Li, Chengdu (CN); Bei Ning Li, Chengdu (CN); Li Hui Wu, Chengdu (CN)

(73) Assignee: SAP SE, Walldorf (DE)

( * ) Notice: Subject to any disclaimer, the term of this patent is extended or adjusted under 35 U.S.C. 154(b) by 410 days.

(21) Appl. No.: 14/334,976

(22) Filed: Jul. 18, 2014

(65) Prior Publication Data

US 2016/0019261 A1    Jan. 21, 2016

(51) Int. Cl.
*G06F 17/30* (2006.01)
*H04L 12/58* (2006.01)
*G06Q 10/06* (2012.01)

(52) U.S. Cl.
CPC ... *G06F 17/30424* (2013.01); *G06Q 10/0631* (2013.01); *H04L 51/046* (2013.01); *H04L 51/08* (2013.01)

(58) Field of Classification Search
CPC ... H04L 51/08; H04L 51/046; G06Q 10/0631; G06F 17/30424
USPC .......................................................... 707/769
See application file for complete search history.

(56) References Cited

U.S. PATENT DOCUMENTS

| | | | |
|---|---|---|---|
| 8,185,591 B1* | 5/2012 | Lewis | G06Q 10/107 358/1.15 |
| 2003/0041112 A1* | 2/2003 | Tada | G06Q 10/107 709/206 |
| 2003/0081001 A1* | 5/2003 | Munro | G06Q 10/107 715/752 |
| 2004/0199500 A1* | 10/2004 | Masuda | G06Q 10/107 707/999.003 |
| 2006/0168543 A1* | 7/2006 | Zaner-Godsey | G06Q 10/107 715/835 |
| 2007/0061308 A1* | 3/2007 | Hartwell | G06F 3/0484 707/999.003 |

(Continued)

*Primary Examiner* — Tiffany Bui
(74) *Attorney, Agent, or Firm* — Schwegman Lundberg & Woessner, P.A.

(57) ABSTRACT

Methods, systems, and computer program products for generating a search of attachments are described. A search request based on a business template is obtained, the business template comprising a node containing an identity of an entity to which the attachment is attached and an attachment sub-node. A search request based on an attachment template is obtained, the attachment template comprising a root node referring to the attachment sub-node of the business template and a node containing an identity of the attachment. A search is performed based on the business template and the attachment template.

20 Claims, 26 Drawing Sheets

(56) References Cited

U.S. PATENT DOCUMENTS

| | | | |
|---|---|---|---|
| 2007/0179945 A1* | 8/2007 | Marston | G06Q 10/107 707/999.005 |
| 2008/0010350 A1* | 1/2008 | Chen | G06Q 10/107 709/206 |
| 2009/0132490 A1* | 5/2009 | Okraglik | H04L 51/22 707/999.003 |
| 2010/0115456 A1* | 5/2010 | Thomas | G06F 3/0481 715/782 |
| 2012/0124143 A1* | 5/2012 | Chung | G06Q 10/107 709/206 |
| 2012/0215786 A1* | 8/2012 | Abbott | G06F 17/30312 707/741 |
| 2015/0169599 A1* | 6/2015 | Burnett | H04L 51/08 707/662 |

* cited by examiner

| STRUCTURE | CRMS_BO_DOCUMENTS_URI | | ACTIVE | | |
|---|---|---|---|---|---|
| SHORT DESCRIPTION | LINK BETWEEN A BUSINESS OBJECT AND A DOCUMENT | | | | |

| ATTRIBUTES | COMPONENTS | ENTRY/HELP/CHECK | CURRENCY/QUANTITY FIELDS |
|---|---|---|---|

PREDEFINED TYPE                                    1/20

| COMPONENT | TYPING METHOD | COMPONENT TYPE | DATA TYPE | LENGTH | DECI... | SHORT DESCRIPTION |
|---|---|---|---|---|---|---|
| .INCLUDE | TYPES | SIBF_IO | | 0 | 0 | KW FRAMEWORK:OBJECT KEY |
| OBJTYPE | TYPES | SIBF_IOTY | CHAR | 1 | 0 | KW FRAMEWORK:IO TYPE |
| .INCLUDE | TYPES | SDOKOBJECT | | 0 | 0 | SDOK: BOR KEY FOR INFORMATION OBJECT |
| CLASS | TYPES | SDOK_CLASS | CHAR | 10 | 0 | DOCUMENT CLASS |
| OBJID | TYPES | SDOK_DOCID | CHAR | 32 | 0 | ID FOR DOCUMENTS AND RELATIONS |
| BO_INSTID | TYPES | SIBFBORIID | CHAR | 70 | 0 | INSTANCE IDENT. IN BOR COMPAT. PERSISTENT OBJECT REFRENCE |
| DOCUMENT_URI | TYPES | SAEURI | CHAR | 4096 | 0 | ARCHIVELINK: DATA ELEMENT FOR ABSOLUTE URI |
| NAME | TYPES | SKWF_URLP | CHAR | 40 | 0 | NAME |
| FILE NAME | TYPES | SDOK_FILNM | CHAR | 255 | 0 | RELATIVE STORAGE LOCATION OF PHYSICAL DOCUMENT |
| FILE TYPE | TYPES | SDOK_TRFMD | CHAR | 1 | 0 | TYPE OF DATA TRANSFER |
| FILE SIZE | TYPES | SDOK_FSIZE | NUMC | 12 | 0 | FILE SIZE (IN BYTES) |
| MIMETYPE | TYPES | W3CONTTYPE | CHAR | 128 | 0 | HTML CONTENT TYPE |
| DOC_TYPE | TYPES | CRMT_DOC_TYPE | STRING | 0 | 0 | CRM CONTENT MANAGEMENT: CLEAR TEXT FOR MIME TYPE |
| DOC_CONTENT_URL | TYPES | CRMT_DOC_CONTEN..... | STRING | 0 | 0 | CRM CONTENT MANAGEMENT: URL TO DOCUMENT CONTENT |
| DESCRIPTION | TYPES | CRMT_DESCRIPTIO..... | CHAR | 64 | 0 | DESCRIPTION OF A DOCUMENT |
| CREATED_BY | TYPES | CRMT_CRUSR | CHAR | 12 | 0 | CREATED BY |
| CREATED_AT | TYPES | CRMT_DOC_CRTST | NUMC | 14 | 0 | CREATED ON (UTC) |
| LAST_CHANGED_BY | TYPES | CRMT_CHUSR_CM | CHAR | 12 | 0 | LAST CHANGED BY |
| LAST_CHANGED_AT | TYPES | CAMT_DOC_CHTST | NUMC | 14 | 0 | CHANGED AT(UTC) |
| LANGUAGE | TYPES | SPRAS | LANG | 1 | 0 | LANGUAGE KEY |

*FIG. 9*

GENIL MODEL EDITOR: DISPLAY COMPONENT MODEL BP

- DEPENDENT OBJECT BUILTCONTRACTBUZHOURFIXEDN
- DEPENDENT OBJECT BUILTCONTRACTBUZHOURSMONTHLY1
- DEPENDENT OBJECT BUILTCONTRACTBUZHOURSMONTHLY2
- DEPENDENT OBJECT BUILTCONTRACTBUZHOURSWEEKLY
- DEPENDENT OBJECT BUILTCONTRACTINTERACTIONHISTORY
- DEPENDENT OBJECT BUILTCONTRACTOPPORTUNITY
- DEPENDENT OBJECT BUILTCONTRACTPARTNERFUCTION
- DEPENDENT OBJECT BUILTCONTRACTPERSONADDRDUPLICATE
- DEPENDENT OBJECT BUILTCONTRACTPERSONADDRESS
- DEPENDENT OBJECT BUILTCONTRACTPERSONADDRFAX
- DEPENDENT OBJECT BUILTCONTRACTPERSONADDRMULTICOMM
- DEPENDENT OBJECT BUILTCONTRACTPERSONADDRPAGER
- DEPENDENT OBJECT BUILTCONTRACTPERSONADDRPHONE
- DEPENDENT OBJECT BUILTCONTRACTPERSONADDRSMTP
- DEPENDENT OBJECT BUILTCONTRACTPERSONADDRSSF
- DEPENDENT OBJECT BUILTCONTRACTPERSONADDRURI
- DEPENDENT OBJECT BUILTCONTRACTPERSONADDRVERSION
- DEPENDENT OBJECT BUILTCONTRACTSRVREG
- DEPENDENT OBJECT BUILTCONTRACTSTANDARDADDRESS
- DEPENDENT OBJECT BUILCREDITCARDCCH
- DEPENDENT OBJECT BUILCUSTOMERTRANSACTIONS
- DEPENDENT OBJECT BUILDEFAULTSALESAGREEMENT
- DEPENDENT OBJECT BUILDOCSET
  - KEY STRUCTURE SKWF_IO
  - ATTRIBUTE STRUCTURE CRMS_BO_DOCUMENTS_URI
    - METHODS
    - RELATIONS
    - USAGE
- DEPENDENT OBJECT BUILEMPINTERACTIONHISTORY

1004

| KEY STRUCTURE | SKWF_IO |
| ATTRIBUTE STRUCTURE | CRMS_BO_DOCUMENTS_URI |
| ROOT OBJECT | BUILHEADER |
| SUPER OBJECT | |
| WEB SERVICE ENABLED | ☐ |

ADVANCED SETTINGS

| DYNAMIC MODIFY CHECK | NOT SUPPORTED |
| DYNAMIC DELETE CHECK | NOT SUPPORTED |
| DYNAMIC CREATE DATA | NOT SUPPORTED |
| DEFERRING ATTRPROPS SUPPORTED | ☐ |
| NO ERRORS ACCEPTED | ☐ |
| DIRECT CREATE REQUESTED | ☐ |
| NON-UNIQUE PARENT | ☐ |
| OPTIMISTIC LOCKING SUPPORTED | ☐ |
| ASYNCHRONOUS SAVE | ☐ |
| TRANSIENT OBJECT | ☐ |
| MASS ACCESS ENABLED | ☐ |

SWITCH SETTINGS

| SWITCH | |
| REACTION TO SWITCH | |
| CURRENT STATE | ACTIVE |

DEFINE MODEL CRM_ACCOUNT OF SOFTWARE COMPONENT BBPCRM

| [1] | [2] | [3] | [4] | [5] | [6] | MODEL LANGUAGE ENGLISH ▽ |
|---|---|---|---|---|---|---|
| MODEL PROPERTIES | MODEL NODES | NODE RELATIONS | MODEL REQUESTS | NODE RESPONSE | OPERATIONAL DATA PROVIDER | |

[ < PREVIOUS ] [ NEXT > ] [ CANCEL ] [ FINISH ] [ SAVE ]

STRUCTURE OF 'CRM_ACCOUNT'

HERE YOU DEFINE THE STRUCTURE OF THE MODEL BASED ON ITS NODES (COMPOSITION). YOU CAN ALSO ADD RELATIONSHIPS TO OTHER MODEL NODES.

[ CREATE ASSOCIATION ] [ DELETE ]

| NODE | NODE DESCRIPTION | * ASSOCIATION | * CARDINALITY | *REVERSE CARDINALITY | SUB... |
|---|---|---|---|---|---|
| ▼BUILHEADER | BUILHEADER | | | | ☑ |
| ▷BUILADDRESS | BUILADDRESS | | ARBITRARY | EXACTLY ONE | ☐ |
| ▷BUILCLASSIFICATION | BUILCLASSIFICATION | | ARBITRARY | EXACTLY ONE | ☐ |
| ▼BUILDOCSET | BUILDOCSET | | ARBITRARY | EXACTLY ONE | ☐ |
| CRM_ACCOUNT_ATTACH.CR... | | | EXACTLY ONE | EXACTLY ONE | ☐ |
| ▷BUILEMPLOYEERESPONS| | BUILEMPLOYEERESPONS| | | ARBITRARY | EXACTLY ONE | ☐ |
| CRM_EMPLOYEE.BUILEMP | BUILEMP | 4803F5C1EC7A6... | EXACTLY ONE | EXACTLY ONE | ☐ |
| BUILCIMALTERNATIVEID | BUILCIMALTERNATIVEID | | ARBITRARY | EXACTLY ONE | ☐ |
| ▷BUILDNUMBER | BUILDNUMBER | | | | ☐ |
| CRM_TB039.TB039T | TB039T | 47FFBA0E690016... | EXACTLY ONE | ARBITRARY | ☐ |

DETAILS: FOREIGN KEYS OF NODE 'BUILDOCSET'

HERE YOU CAN DEFINE THE FOREIGN KEYS FOR THE RELATIONSHIPS ADDED ABOVE. YOU CAN EITHER ASSIGN KEY ATTRIBUTES BETWEEN PARENT AND CHILD NODES OR DEFINE FIXED VALUES FOR RELATIONSHIP KEY ATTRIBUTES (SEVERAL VALUES POSSIBLE SEPARATED BY ';'). IF A FIXED VALUE SHALL BE THE INITIAL ONE, ENTER <INITIAL>. WITH REGARD TO THE FIRST OPTION, THE SYSTEM GENERATES A PROPOSAL FOR THE FOREIGN-KEY RELATION BASED ON NAME EQUITY OF THE NODE'S ATTRIBUTES.

[ CREATE ] [ DELETE ]

| *ATTRIBUTES OF PARENT NODE'... | *VALUE | *ATTRIBUTES OF CHILD NODE 'BUILDOCSET' | *VALUE | JOIN OPERATOR |
|---|---|---|---|---|
| ES_OWN_KEY | | ES_FATHER_KEY | | EQUAL |

DEFINE MODEL CRM_ACCOUNT_ATTACH OF SOFTWARE COMPONENT BBPCRM    MODEL LANGUAGE [ENGLISH ▷]

MODEL PROPERTIES | MODEL REQUESTS | NODE RESPONSE
[<PREVIOUS] [NEXT>] [CANCEL] [FINISH] [SAVE]

REQUESTS OF 'CRM_ACCOUNT_ATTACH'  — 1612

HERE YOU CAN DEFINE HOW USERS CAN ACCESS DATA OF THE MODEL. FOR APPLICATION MODELS AND VIRTUAL MODELS IT IS POSSIBLE TO GENERATE A DEFAULT REQUEST THAT CONTAINS ALL RESPONSE ATTRIBUTES OF THE ROOT NODE. THE DEFAULT REQUEST IS EXECUTED IN A FREE-FORM SEARCH REQUEST ATTRIBUTES CAN BE CHOSEN FROM ANY NODE OF ANY MODEL THAT IS LINKED DIRECTLY OR INDIRECTLY TO THIS MODEL.

[GENERATE DEFAULT REQUEST] [CREATE] [DELETE] [WHERE-USED]

| *NAME | *DESCRIPTION | DEFAULT REQUEST | ALTR. SEARCH | VALUE HELP |
|---|---|---|---|---|
| DEFAULT | DEFAULT REQUEST (ALL RESPONSE ATTRIBUTES) | ⦿ | ☑ | ☐ |

— 1616

DETAILS: ATTRIBUTES OF REQUEST 'DEFAULT'
[ADD] [REMOVE] [RESET ATTRIBUTE DESCRIPTION] [MOVE] [CREATE FROM REFERENCE] [VIEW SWITCH ASSIGNMENT]

| ATTRIBUTE GROUP/ATTRIBUTE | *DESCRIPTION | SEL. | REFERENCE NODE | REFERENCE AT... | REFERENCE | TYPE | INT. NAV. R... | FREESTYLE | SWITCHED |
|---|---|---|---|---|---|---|---|---|---|
| NAME | NAME | SEL | CRM_ACCOUNT.BU | NAME | NAME | CHAR(40) | LOW | ☑ | ☐ |
| FILE_NAME | RELATIVE STORAGE LOCAT... | SEL | CRM_ACCOUNT.BU | FILE_NAME | RELATIVE ST... | CHAR(255) | LOW | ☑ | ☐ |
| DESCRIPTION | DESCRIPTION OF A DOC... | SEL | CRM_ACCOUNT.BU | DESCRIPTION | DESCRIPTION... | CHAR(64) | LOW | ☑ | ☐ |
| BP_GUID | BUSINESS PARTNER GUID | SEL | CRM_ACCOUNT.BU | BP_GUID | BUSINESS P... | RAW(16) | LOW | ☐ | ☐ |
| BP_NUMBER | BUSINESS PARTNER NUM... | SEL | CRM_ACCOUNT.BU | BP_NUMBER | BUSINESS P... | CHAR(10) | LOW | ☐ | ☐ |
| DOC_CONTENT_URL | CRM CONTENT MANAGEM... | SEL | CRM_ACCOUNT.BU | DOC_CONTENT_U | CRM CONTE... | STRG | LOW | ☑ | ☐ |

| DATA BROWSER: TABLE WCFD_ES_BOL_Q SELECT ENTRIES 85 | | | | | | |
|---|---|---|---|---|---|---|
| TABLE: WCFD_ES_BOL_Q | | | | | | |
| DISPLAYED FIELDS: 7 OF 7 FIXED COLUMNS: 3 LIST WIDTH: 0250 | | | | | | |
| CLIENT | SAP_SW_COMP | TEMPLATE_ID | BOL_QUERY | BOR_OBJ_TYPE | CHANGED_BY | CHANGED_AT |
| 504 | BBPCRM | CRM_ACCOUNT | BuilHeaderAdvancedSearch | BUS1006 | KUSCHNER | 20.130.914.140.754 |
| 504 | BBPCRM | CRM_ACCOUNT_ATTACH | | | | 0 |
| 504 | BBPCRM | CRM_ACCOUNT_T | BuilHeaderAdvancedSearch | BUS1006 | HACKE | 20.101.102.155.847 |
| 504 | BBPCRM | CRM_BILLING | BDDynamicSearch | BUS20810 | HACKE | 20.110.117.135.843 |
| 504 | BBPCRM | CRM_BUS2000106 | BTQKNOART | BUS2000106 | HACKE | 20.110.117.143.038 |
| 504 | BBPCRM | CRM_BUS2000107 | BTQIsAgrmnt | BUS2000107 | HACKE | 20.110.117.140.918 |
| 504 | BBPCRM | CRM_BUS2000107_OAS | BTQSrvAgr | BUS2000107 | HACKE | 20.110.117.141.934 |
| 504 | BBPCRM | CRM_BUS2000108 | BTQLeadDoc | BUS2000108 | HACKE | 20.101.007.064.305 |
| 504 | BBPCRM | CRM_BUS2000111 | BTQOpp | BUS2000111 | SOLZBACHER | 20.131.114.115.336 |
| 504 | BBPCRM | CRM_BUS2000111_AIH | | | | 0 |
| 504 | BBPCRM | CRM_BUS2000111_DR | BTQOpp | BUS2000111 | HACKE | 20.110.117.135.819 |
| 504 | BBPCRM | CRM_BUS2000111_T | BTQOpp | BUS2000111 | WITTIGF | 20.101.007.064.352 |
| 504 | BBPCRM | CRM_BUS2000112_SC | BTQSrvCon | BUS2000112 | HACKE | 20.110.117.142.045 |
| 504 | BBPCRM | CRM_BUS2000112_SCQ | BTQSrcQuot | BUS2000112 | HACKE | 20.110.117.132.126 |
| 504 | BBPCRM | CRM_BUS2000114 | BTQLeasObj | BUS2000114 | HACKE | 20.110.117.135.553 |
| 504 | BBPCRM | CRM_BUS2000115 | BTQIsOrd | BUS2000115 | HACKE | 20.101.007.064.404 |
| 504 | BBPCRM | CRM_BUS2000115QUOT | BTQIsQuot | BUS2000115 | HACKE | 20.101.007.064.415 |
| 504 | BBPCRM | CRM_BUS2000116 | BTQSrvOrd_ES | BUS2000116 | HACKE | 20.110.117.142.026 |
| 504 | BBPCRM | CRM_BUS2000116_RFC | BTQSrvReq | BUS2000116 | HACKE | 20.110.117.143.025 |
| 504 | BBPCRM | CRM_BUS2000116_SRVQ | BTQSrvQuot | BUS2000116 | HACKE | 20.110.117.142.018 |
| 504 | BBPCRM | CRM_BUS2000116_SRVT | BTQSrvTicket | BUS2000116 | HACKE | 20.110.117.142.854 |
| 504 | BBPCRM | CRM_BUS2000117 | BTQSrvCfm | BUS2000117 | HACKE | 20.110.117.142.037 |
| 504 | BBPCRM | CRM_BUS2000120 | BTQCompl | BUS2000120 | HACKE | 20.110.117.141.843 |

DICTIONARY: DISPLAY STRUCTURE

STRUCTURE: /1CRMES/CRM_ACCOUNT_ATTACH_Q    ACTIVE
SHORT DESCRIPTION: /1CRMES/CRM_ACCOUNT_ATTACH_Q

| ATTRIBUTES | COMPONENTS | INPUT HELP / CHECK | CURRENCY/QUANTITY FIELDS |

PREDEFINED TYPE    1/7

| COMPONENT | TYPING METHOD | COMPONENT TYPE | DATA TYPE | LENGTH | DECI... | SHORT DESCRIPTION |
|---|---|---|---|---|---|---|
| ALL_ATTRIBUTES_SE | TYPES | CRM_ES_STRING | STRING | 0 | 0 | STRING FOR NODE NAME |
| BP_GUID | TYPES | BU_PARTNER_GUID | RAW | 16 | 0 | BUSINESS PARTNER GUID |
| BP_NUMBER | TYPES | BU_PARTNER | CHAR | 10 | 0 | BUSINESS PARTNER NUMBER |
| DESCRIPTION | TYPES | CRMT_DESCRIPTION | CHAR | 64 | 0 | DESCRIPTION OF A DOCUMENT |
| DOC_CONTENT_URL | TYPES | CRMT_DOC_CONT... | STRING | 0 | 0 | CRM CONTENT MANAGEMENT: URL TO DOCUMENT CONTENT |
| FILE_NAME | TYPES | SDOK_FILNM | CHAR | 255 | 0 | RELATIVE STORAGE LOCATION OF PHYSICAL DOCUMENT |
| NAME | TYPES | SKWF_URLP | CHAR | 40 | 0 | NAME |

DICTIONARY: DISPLAY STRUCTURE

STRUCTURE: /1CRMES/CRM_ACCOUNT_ATTACH_R  ACTIVE
SHORT DESCRIPTION: /1CRMES/CRM_ACCOUNT_ATTACH_R

HIERARCHY DISPLAY    APPEND STRUCTURE...

ATTRIBUTES / COMPONENTS / INPUT HELP/CHECK / CURRENCY/QUANTITY FIELDS

PREDEFINED TYPE    1/8

| COMPONENT | TYPING METHOD | COMPONENT TYPE | DATA TYPE | LENGTH | DECI... | SHORT DESCRIPTION |
|---|---|---|---|---|---|---|
| BP_GUID | TYPES | BU_PARTNER_GUID | RAW | 16 | 0 | BUSINESS PARTNER GUID |
| BP_NUMBER | TYPES | BU_PARTNER | CHAR | 10 | 0 | BUSINESS PARTNER NUMBER |
| CLASS | TYPES | SDOK_CLASS | CHAR | 10 | 0 | DOCUMENT CLASSS |
| DESCRIPTION | TYPES | CRMT_DESCRIPTION | CHAR | 64 | 0 | DESCRIPTION OF A DOCUMENT |
| FILE_NAME | TYPES | SDOK_FILNM | CHAR | 255 | 0 | RELATIVE STORAGE LOCATION OF PHYSICAL DOCUMENT |
| NAME | TYPES | SKWF_URLP | CHAR | 40 | 0 | NAME |
| OBJID | TYPES | SDOK_DOCID | CHAR | 32 | 0 | ID FOR DOCUMENTS AND RELATIONS |
| OBJTYPE | TYPES | SKWF_IOTY | CHAR | 1 | 0 | KW FRAMEWORK: IO TYPE |

*FIG. 19B*

METHODS, SYSTEMS, AND APPARATUS FOR SEARCH OF ELECTRONIC INFORMATION ATTACHMENTS

FIELD

The present disclosure relates, generally, to conducting electronic searches. In an example embodiment, the disclosure relates to searching electronic information attachments of electronic communications and electronic information attachments of business objects.

BACKGROUND

Business objects, electronic mail, and other communications are often searched to identify and retrieve relevant information. The content of a business object, or the subject line and body of electronic mail, may be searched. Attachments to the electronic mail, such as attached documents, may also contain information relevant to the search in, for example, the title of the attachment and/or in the body of the attachment.

BRIEF DESCRIPTION OF DRAWINGS

The present disclosure is illustrated by way of example and not limitation in the figures of the accompanying drawings, in which like references indicate similar elements and in which:

FIG. 9 is an example data structure for a dependent node of the attachment business object, in accordance with an example embodiment;

FIG. 10 illustrates the addition of a dependent node to a business object layer model of business partners, in accordance with an example embodiment;

FIG. 13 illustrates an example enterprise search template, in accordance with an example embodiment;

FIG. 14 illustrates an example model structure, in accordance with an example embodiment;

FIG. 15 illustrates an example model structure based on its nodes, in accordance with an example embodiment;

FIG. 16B illustrates an example definition of model requests, in accordance with an example embodiment;

FIG. 16C illustrates an example definition of node responses, in accordance with an example embodiment;

FIG. 18 illustrates an example database table registration of a defined attachment enterprise search template, in accordance with an example embodiment;

FIG. 19A illustrates an example display structure, in accordance with an example embodiment;

FIG. 19B illustrates an example result structure, in accordance with an example embodiment;

DETAILED DESCRIPTION

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for searching electronic information attachments are disclosed. The attachments may be attached to business objects and/or electronic communications, such as electronic mail. The business object may be a sales order, an invoice, and the like. The attachments may be a business object, a file, a document, a spreadsheet, a video file, and the like, and may be in a variety of different formats, including a moving pictures expert group (MPEG) format, Word, Excel, portable document format (PDF), and the like. The search may be conducted on the title of the attachment, the description of the attachment, the content of the attachment, metadata associated with the attachment, and the like.

Figure 1A:
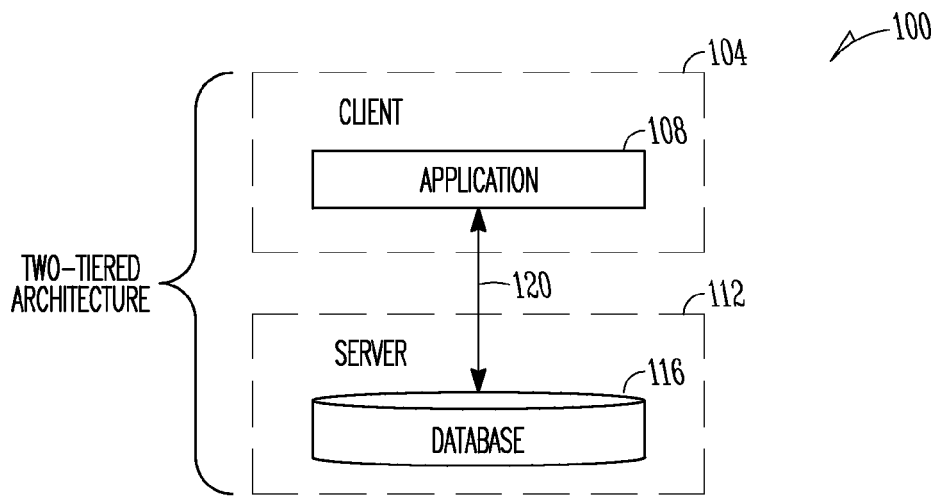
FIGS. 1A and 1B illustrate schematic diagrams of example systems for searching an electronic information attachment of a business object and/or electronic communication, in accordance with an example embodiment.
Figure 1B:
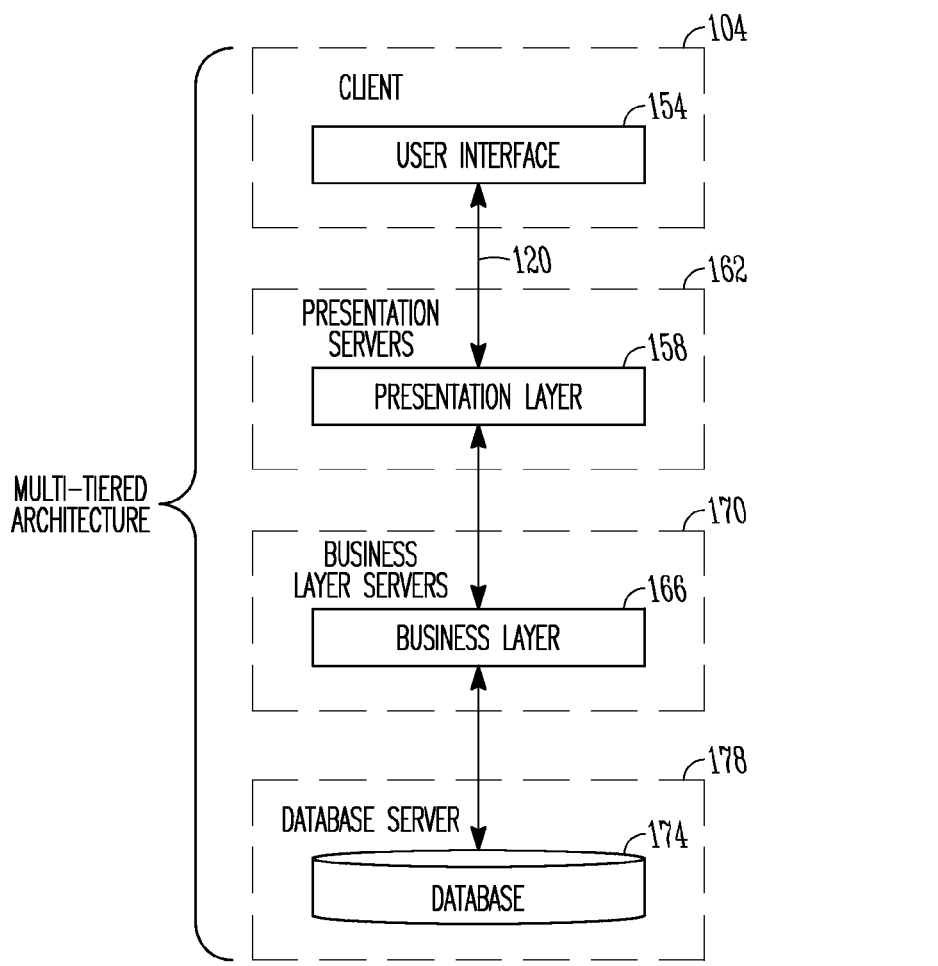

FIGS. 1A and 1B illustrate schematic diagrams of example systems 100, 150 for searching an electronic information attachment of a business object and/or electronic communication, in accordance with an example embodiment. Traditional client-server systems may employ a two-tiered architecture such as that illustrated by system 100 in FIG. 1A. Application 108 executed on the client 104 of the two-tiered architecture may be comprised of a monolithic set of program code including a graphical user interface component, presentation logic, business logic and a network interface that enables the client 104 to communicate over a network 120 with one or more servers 112. A database 116 may be maintained on the server 112 that provides non-volatile or "persistent" storage for the data accessed and/or processed by the application 108.

The "business logic" component of the application 108 may represent the core program code of the application 108, i.e., the rules governing the underlying business process (or other functionality) provided by the application 108. The "presentation logic" may describe the specific manner in which the results of the business logic are formatted for display on the user interface. The "database" 116 may include data access logic used by the business logic to store and retrieve data.

In response to limitations associated with the two-tiered client-server architecture, a multi-tiered architecture has been developed, as illustrated in FIG. 1B. In the multi-tiered system 150, the presentation layer 158, business layer 166 and database 174 may be logically separated from the user interface 154 of the application. These layers may be moved off of the client 104 to one or more dedicated servers on the network 120. For example, the presentation layer 158, the business layer 166, and the database 174 may each be maintained on separate servers (e.g., presentation servers 162, business layer servers 170 and database servers 178).

This separation of logical components and the user interface 154 may provide a more flexible and scalable architecture compared to that provided by the two-tiered model of the system 100 in FIG. 1A. For example, the separation may ensure that all clients 104 share a single implementation of business layer 166. If business rules change, changing the current implementation of business layer 166 to a new version may not call for updating any client-side program code. In addition, the presentation layer 158 may be provided, which generates code for a variety of different user interfaces 154, which may be standard browsers.

Figure 2:
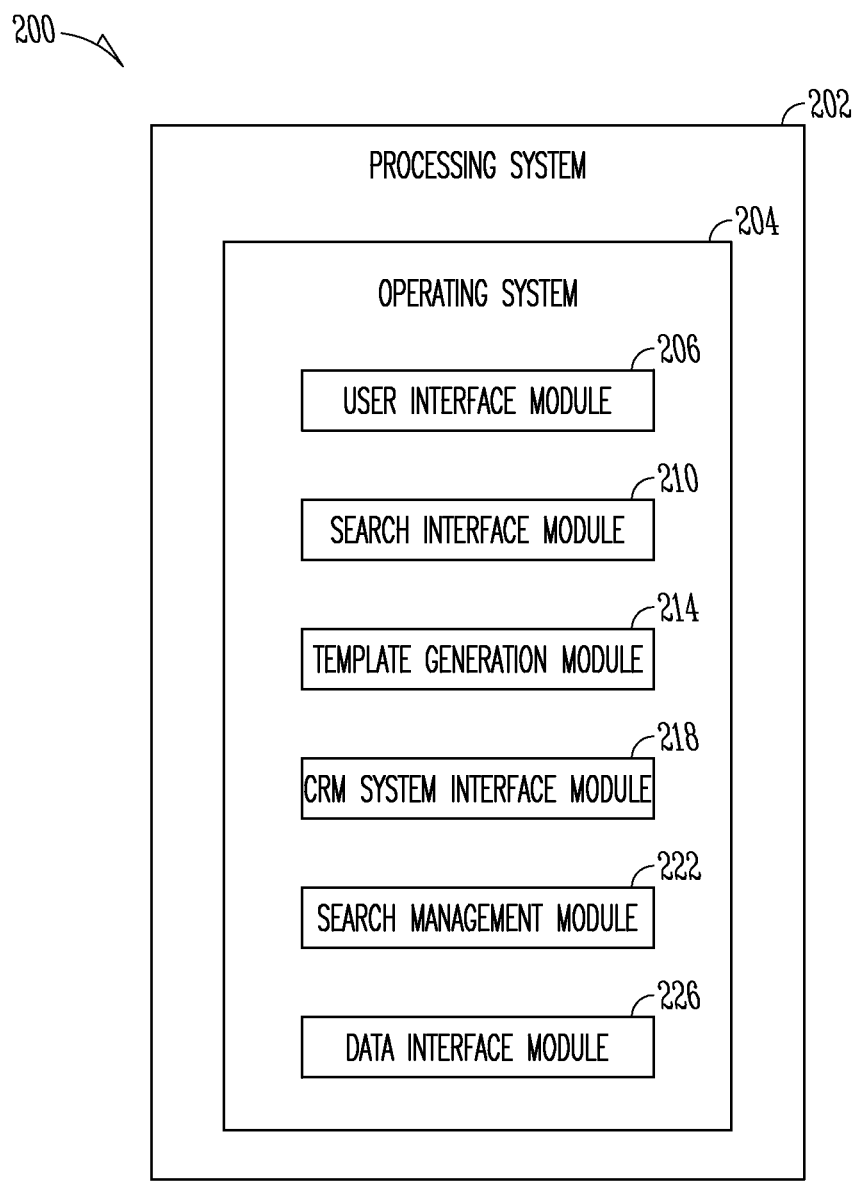
FIG. 2 is a block diagram of an example apparatus for searching electronic information attachments of business objects and/or electronic communications, in accordance with an example embodiment.

FIG. 2 is a block diagram of an example apparatus 200 for searching electronic information attachments of business objects and/or electronic communications, in accordance with an example embodiment.

The apparatus 200 is shown to include a processing system 202 that may be implemented on a server 112, client 104, or other processing device that includes an operating system 204 for executing software instructions. In accordance with an example embodiment, the apparatus 200 may include a user interface module 206, a search interface module 210, a template generation module 214, a customer relationship manager (CRM) system interface module 218, and a search management module 222. In accordance with an example embodiment, the apparatus 200 may include a data interface module 226.

The user interface module 206 may provide a user interface for a user to submit a search, including a search of attachments of business objects and/or electronic communications, as described more fully below in conjunction with FIGS. 3-6. The user interface module 206 may also enable a user to view and access search results, including accessing attachments identified as meeting the search criteria.

The search interface module 210 may submit search requests to and receive search results from an enterprise resource management system, as described more fully below in conjunction with FIGS. 5 and 7.

The template generation module 214 may generate templates for submitting searches for business objects, electronic communications, and attachments of business objects and electronic communications, as described more fully below in conjunction with FIGS. 7, 8, and 17. For example, an enterprise search template may be generated that defines the attributes for a requested search and the attributes to be provided in the search response.

The CRM system interface module 218 may provide an interface between the search management module 222 and a CRM system, as described more fully below in conjunction with FIG. 7. The CRM system may maintain a business object layer model of business objects, as described more fully below in conjunction with FIG. 8. The search management module 222 may search for data including business objects, electronic communications, and electronic information attachments, as described more fully below in conjunction with FIG. 22.

Figure 3:
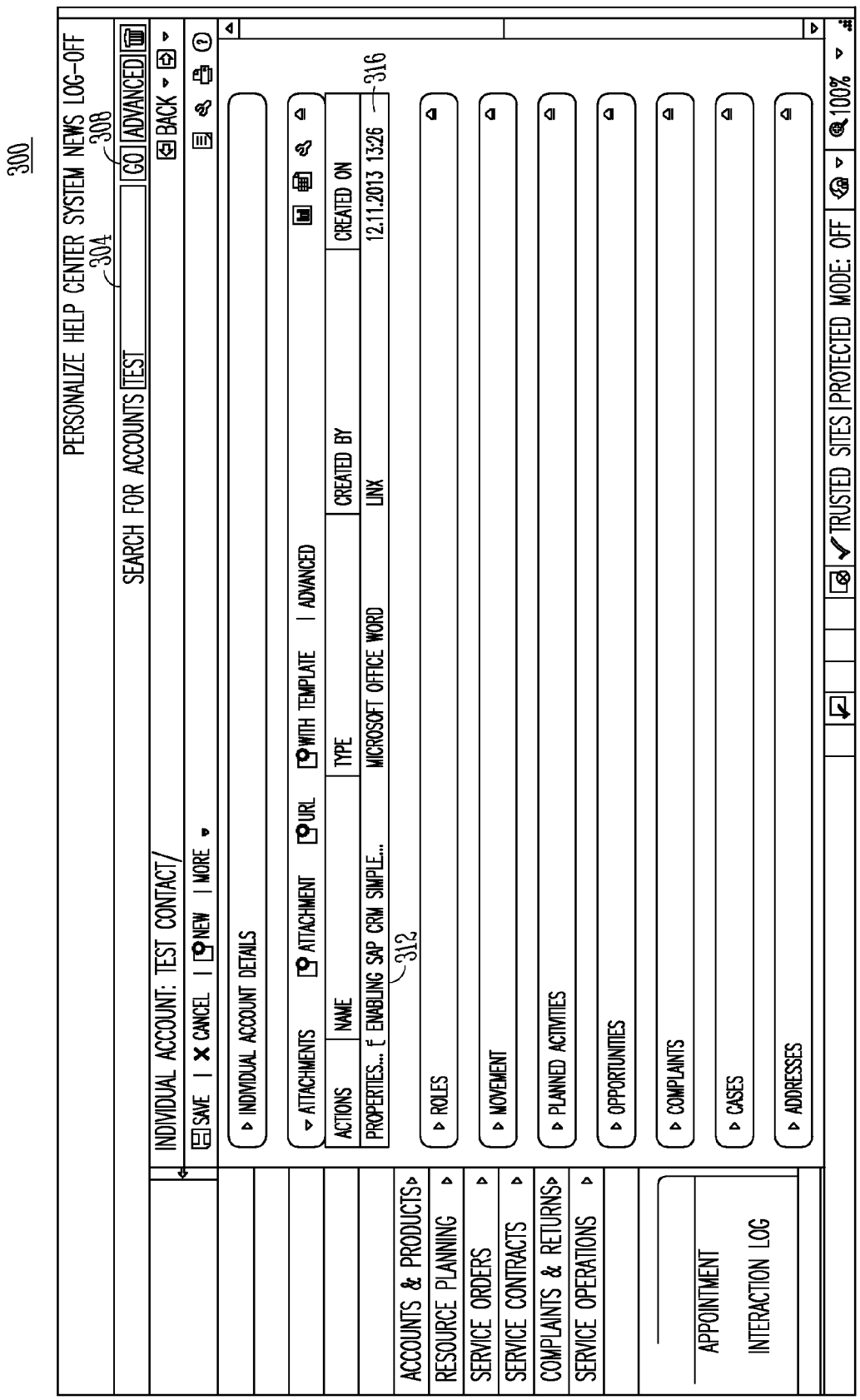
FIG. 3 is a first representation of an example user interface for searching accounts, including an individual account.

FIG. 3 is a first representation of an example user interface 300 for searching accounts, including individual accounts. The term "test" has been entered in the search field 304, the "Go" button 308 has been selected, and a search result 316 has been returned. Although attachments have not been searched, the search result 316 includes an attachment 312 whose name includes the phrase "Enabling SAP CRM Simple." Thus, the search result 316 includes the word "test" and the title of the attachment 312 includes the term "enabling."

Figure 4:
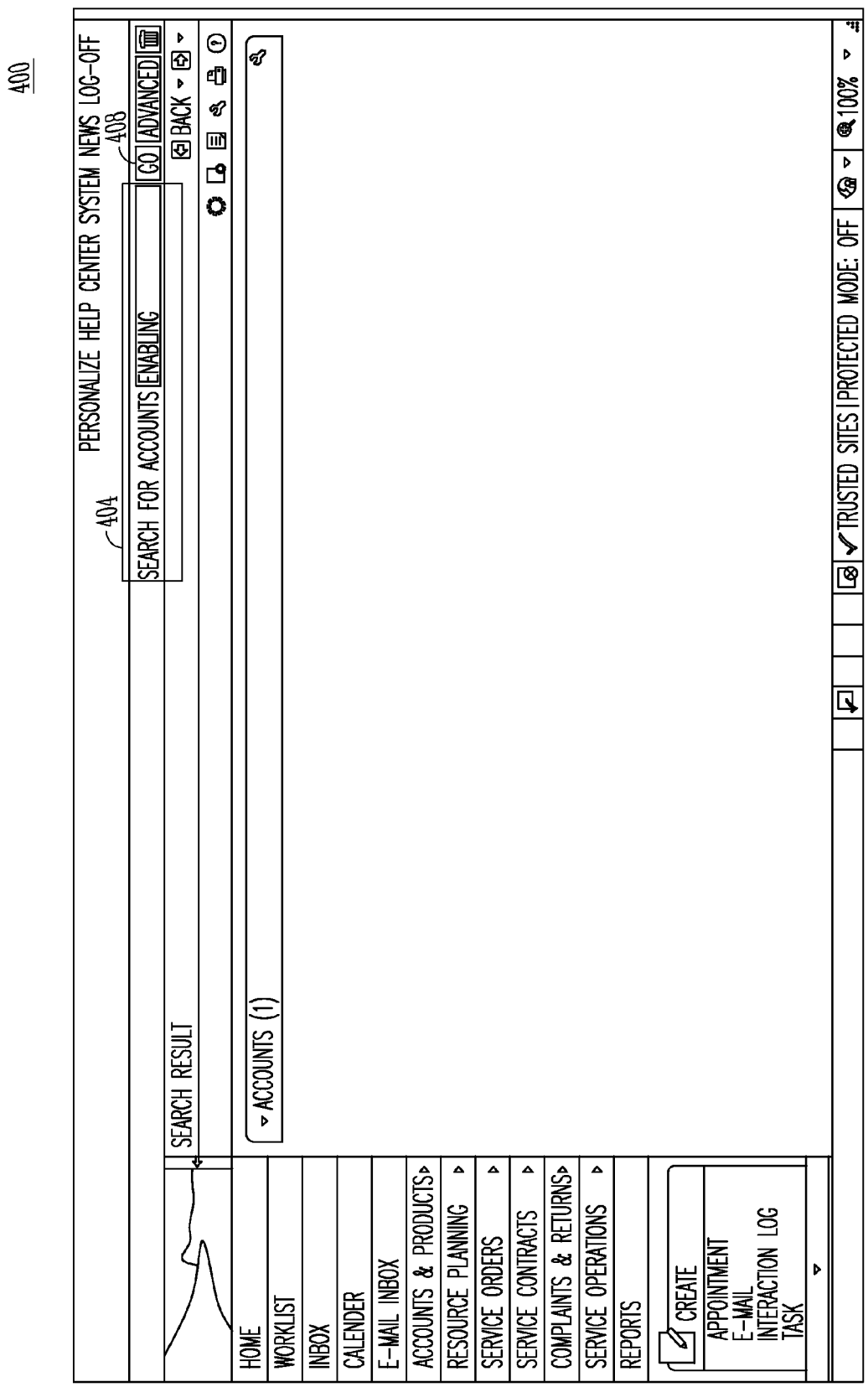
FIG. 4 is a second representation of an example user interface for searching an individual account.

FIG. 4 is a second representation of an example user interface 400 for searching an individual account. As illustrated in FIG. 4, a search has been conducted by entering the term "Enabling" in the search field 404 and selecting the "Go" button 408. Although the search term "Enabling" is recited in at least the title of the attachment 312 displayed in FIG. 3, no search result is returned as attachments have not been searched.

Figure 5:
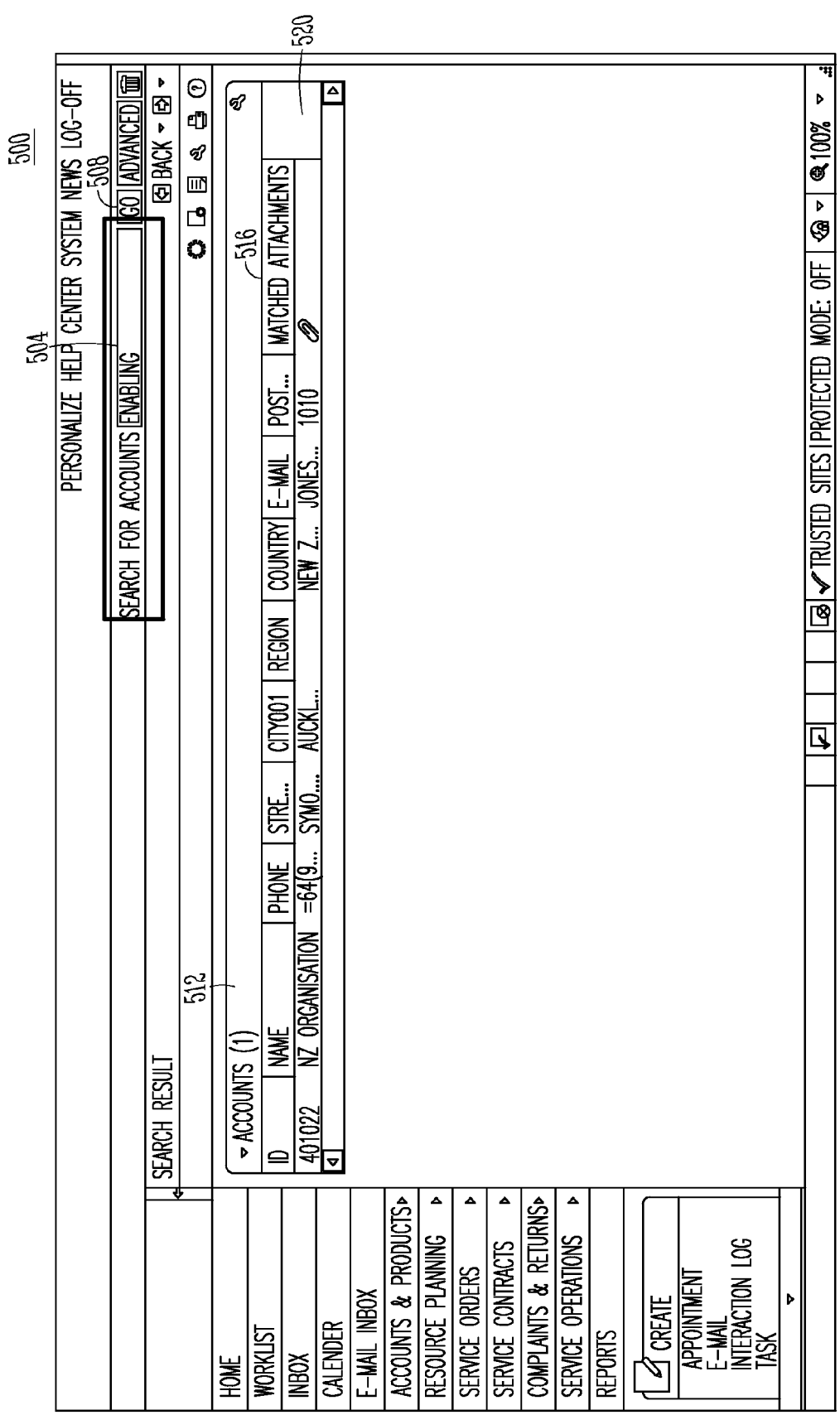
FIG. 5 is a third representation of an example user interface for searching an individual account, in accordance with an example embodiment.

FIG. 5 is a third representation of an example user interface 500 for searching an individual account, in accordance with an example embodiment. As illustrated in FIG. 5, a search has been conducted by entering the term "Enabling" in the search field 504 and selecting the "Go" button 508. In the embodiment of FIG. 5, a search of attachments is conducted; thus, a search result 520 is returned that represents an instance of electronic mail. The image of a paperclip in the matched attachments column 516 indicates that at least one attachment is associated with the search result 520 and, therefore, is associated with the search term "Enabling." Selecting the image of the paperclip may provide a list of the matching attachments, as shown in FIG. 6.

Figure 6:
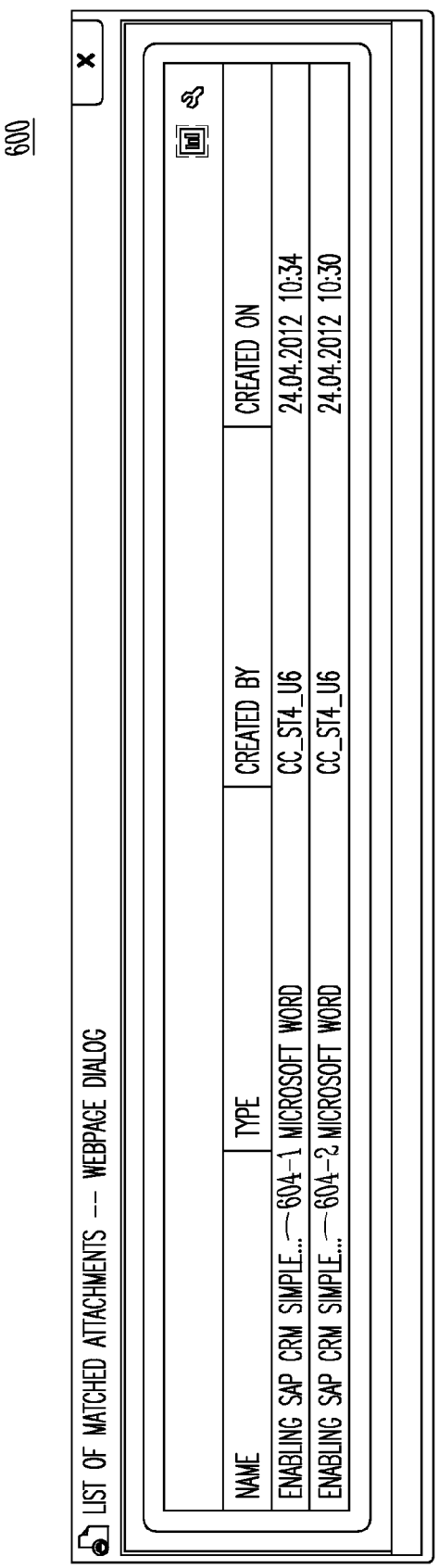
FIG. 6 is a representation of an example user interface for displaying a search result list of attachments, in accordance with an example embodiment.

FIG. 6 is a representation of an example user interface 600 for displaying a search result list of attachments, in accordance with an example embodiment. For example, the user interface 600 may be a pop-up window and may be displayed in response to selecting the image of the paperclip in the matched attachments column 516 of FIG. 5. A user may view details of each attachment 604-1, 604-2 or open the selected attachment 604-1, 604-2 in a known manner.

Figure 7:
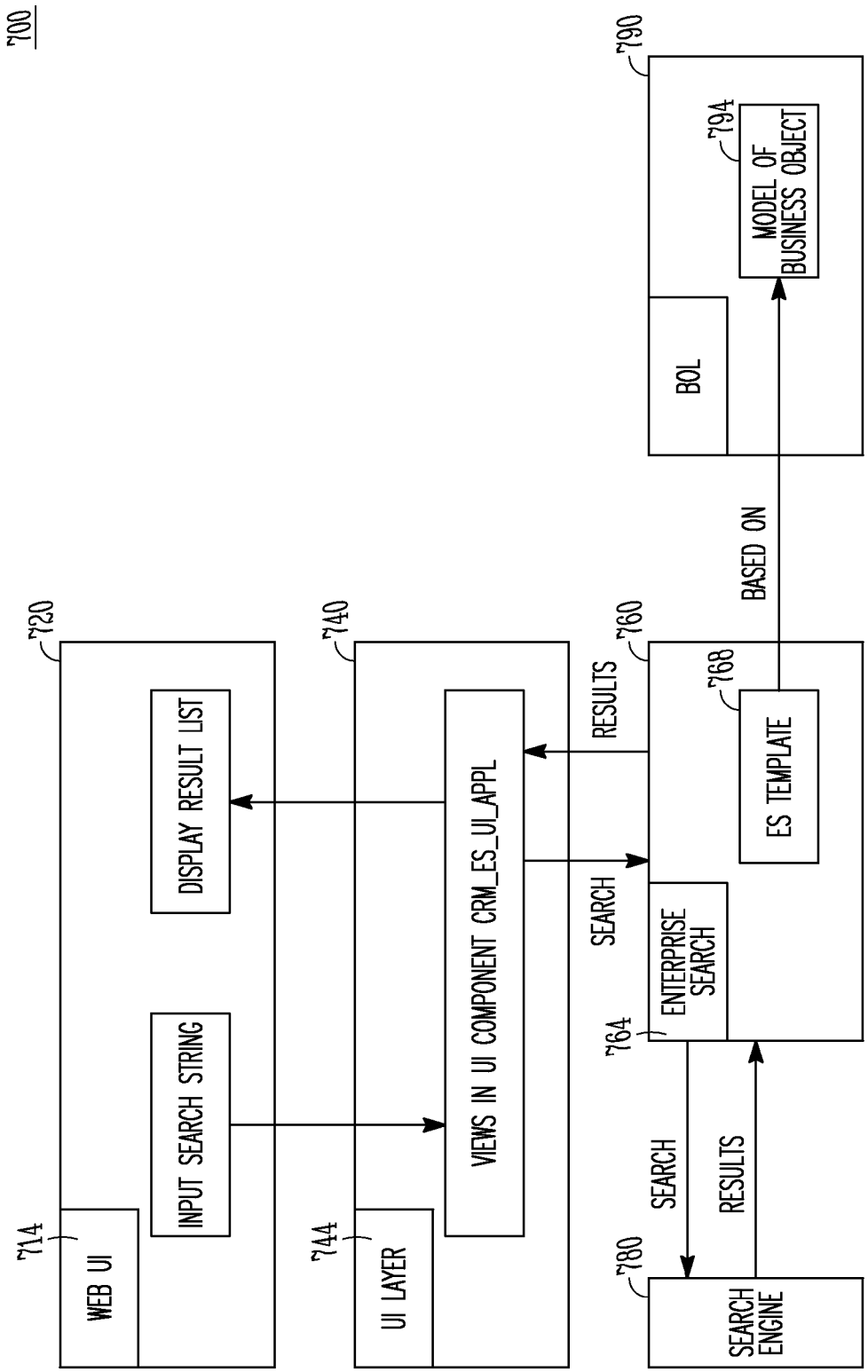
FIG. 7 is a block diagram of an example system for conducting a search, in accordance with an example embodiment.

FIG. 7 is a block diagram of an example system 700 for conducting a search, in accordance with an example embodiment. The system 700 may comprise a client device 720, a backend system 740, an enterprise resource management system 760, and a search engine 780.

The client device 720 may comprise a user interface, such as web user interface 714, that allows a user to, for example, enter an input search string and view a displayed search result list. For example, the web user interface 714 may utilize the representation of the example user interface 500 of FIG. 5 to enable a user to interact with the system 700.

The backend system 740 may comprise a user interface layer 744 and may submit a search to the enterprise resource management system 760 on behalf of the client device 720. The user interface layer 744 may enable the display of views of a Component CRM_ES_UI_APPL (a user interface (UI) component defined for providing enterprise search result views for CRM objects). For example, CRM_ES_UI_APPL/AccountESResult is the enterprise search result view for each business object: account.

The enterprise resource management system 760 may comprise an enterprise search component 764 for issuing a search based on an enterprise search template 768, described further below in conjunction with FIG. 13. As described below, the enterprise search template 768 may be based on a model 794 of a business object within a business object layer 790. The search may be issued to the search engine 780; in response, the search engine 780 may conduct the search and return the search results to the enterprise resource management system 760.

The search engine 780 may perform searches on behalf of other entities. For example, the search engine 780 may perform a search based on the enterprise search template 768 issued by the enterprise resource management system 760 and may return the search result to the enterprise resource management system 760. The search may be performed on the content of the content server and/or on an index of stored content.

The enterprise search template 768 may be used to define a search model based on the business object model 794 of the business object layer 790. For example, the enterprise search template 768 may define the attributes of the requested search and the attributes of the search response. Based on the enterprise search template 768, the search engine 780 may determine the data, such as structured data from a business object node, that is to be returned in response to the requested search. Thus, if a search for a specified string is submitted by a user via client device 720, the submitted string will be forwarded by the backend system 740 to the search engine 780 via the enterprise resource management system 760. The search result, based on the attributes of the enterprise search template 768, may be generated by the search engine 780 and may be forwarded by the enterprise resource management system 760 via the backend system 740 to the client device 720.

Figure 8:
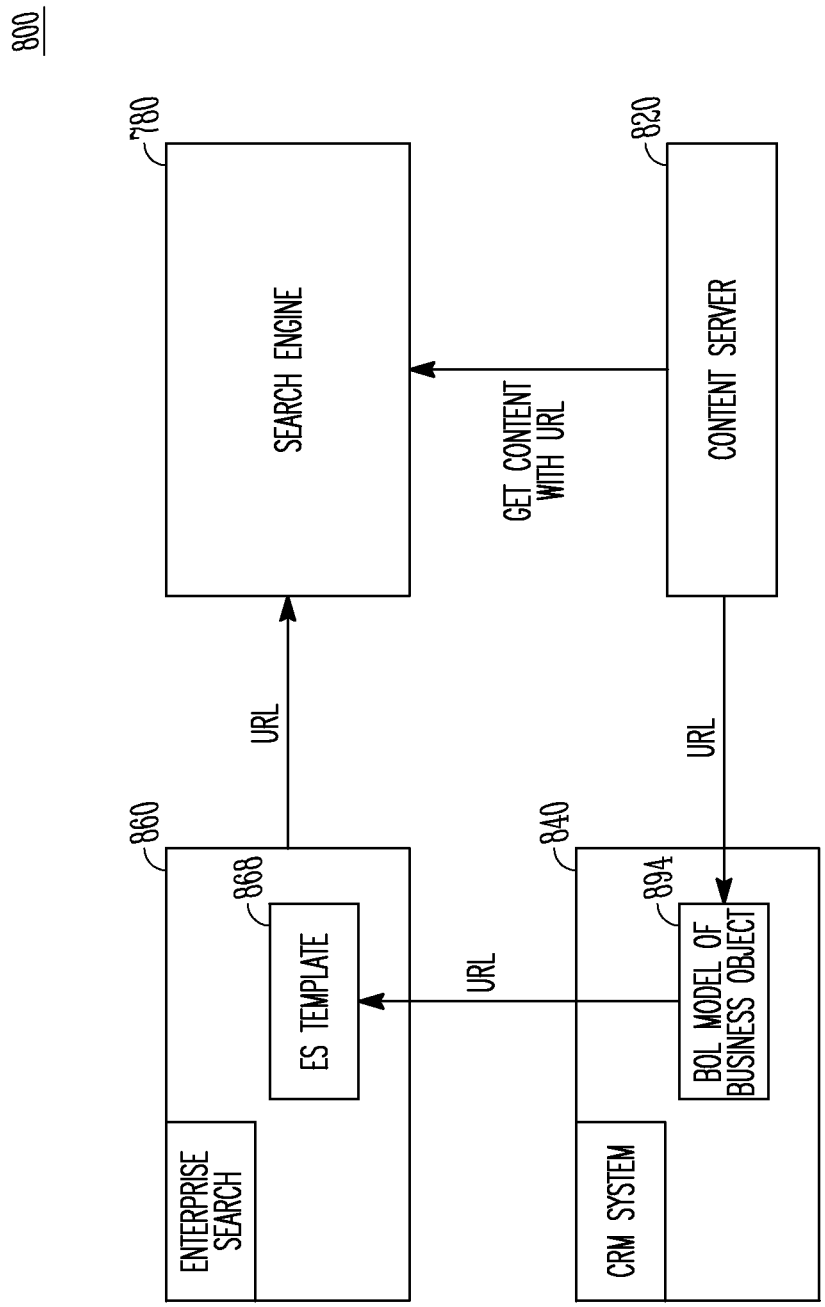
FIG. 8 is an example flow diagram for conducting a search on an attachment, in accordance with an example embodiment.

FIG. 8 is an example flow diagram 800 for conducting a search on an attachment, in accordance with an example embodiment. The content of an attachment, such as a Word document, may be stored on a content server 820 following reception by the system 700. An identifier for the stored attachment, such as a uniform resource locator (URL), may be stored in an attachment business object on a customer resource manager system 840. In addition, a business object for the entity to which the attachment was attached, such as an instance of electronic mail, may also be stored on the customer resource manager system 840. The relationship between the two business objects may be persisted by a model component CM (the Generic interaction layer component model for Content Management) of the business object layer 790. The class CL_CRM_DOCUMENT in the customer resource manager system 840 may provide an application programming interface (API) for a business object to obtain attachment information, such as the URL of the document on the content server 820.

The search engine 780 may have the ability, given a URL, to retrieve an attachment from the content server 820. Thus, a version of the enterprise search template 868, such as a business template, may be defined for the business object of the entity to which the attachment is attached. In addition, the business template may include a type of sub-node, known as an attachment sub-node, that contains the identifier, such as a URL, for the attachment. The information of the business template, which includes information on both the attachment and the entity to which the entity is attached, may be forwarded to the search engine 780 by the enterprise resource management system 760. The search engine 780 may then conduct a search on both the attachment and the entity to which the attachment is attached.

FIG. 9 is an example data structure 900 for a dependent node of the attachment business object, in accordance with an example embodiment. The name of the example data structure 900 is CRMS_BO_DOCUMENTS_URI (an attribute structure for attachment node XXDocSet in each object's Genil component) and the data structure 900 may include information for one attachment, such as an attachment stored in the content server 820. One or more of the attributes of the data structure 900 will be indexed into the search engine 780. The data structure 900 includes the identifier of the corresponding attachment, such as DOCUMENT_CONTENT_URL, which may be used to access the attachment on the content server 820.

FIG. 10 illustrates the addition of a dependent node to a business object layer model 1000 of business partners, in accordance with an example embodiment. In the example of FIG. 10, the dependent node is named BuilDocSet 1004 and has the structure of data structure 900. The root object is BuilHeader because attachments of business partners are connected to this root object. This may vary for different business object layer models.

Figure 11:
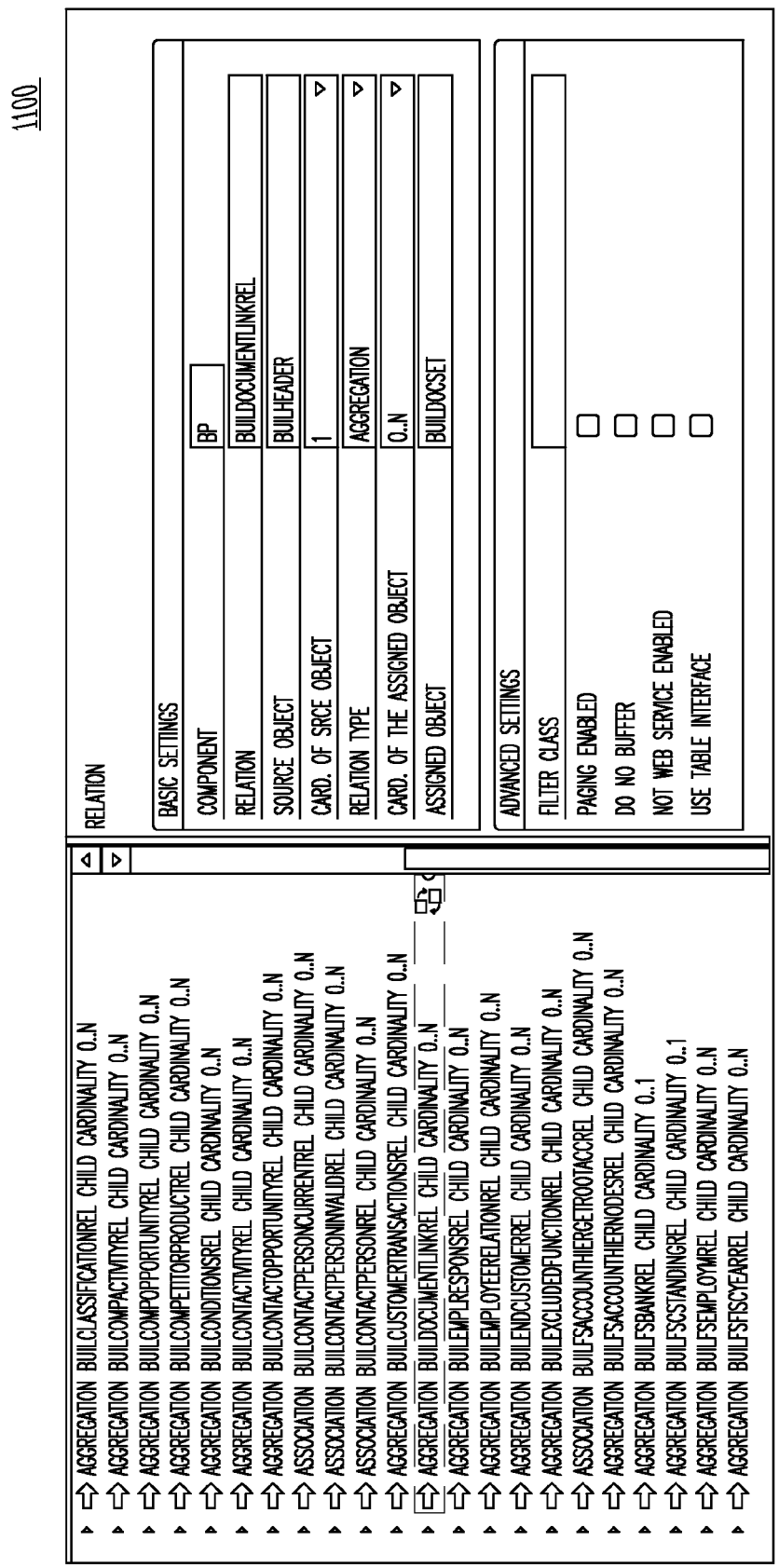
FIG. 11 illustrates an aggregation relation, in accordance with an example embodiment.

In addition, an aggregation relation between the root object and the new dependent node (such as BuilDocSet) may be generated. FIG. 11 illustrates the cited aggregation relation 1100, in accordance with an example embodiment. Generally, the cardinality between the root object and the cited dependent node is 1:0 . . . n.

Figure 12:
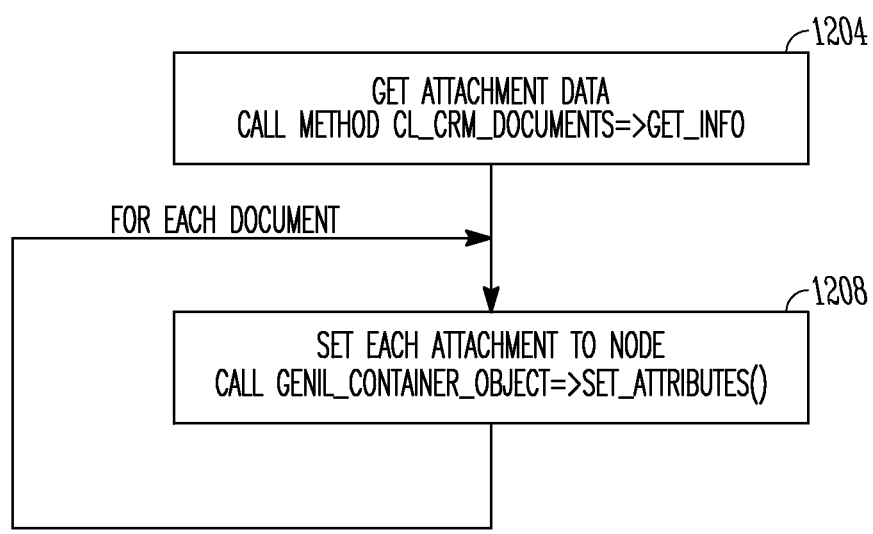
FIG. 12 illustrates an example method for associating an attachment with a node, in accordance with an example embodiment.

FIG. 12 illustrates an example method 1200 for associating an attachment with a node, in accordance with an example embodiment. In one example embodiment, a dependent node has a handle class, regardless of the business object layer model. The implementation of the dependent node and handle class depends on the implementation of the business object. For example, for the business partner BOL, a subclass of class CL_BUIL_ABSTR may be implemented while, for the business transaction BOL, the interface IF_CRM_RUNTIME_BTIL is implemented. (The subclass of class CL_BUIL_ABSTR is the super abstract class for the Genil model node handler class under component BP (Business Partner), i.e., CL_BUPA_IL_DOCUMENT_SET is the handler class for node BuilDocSet. The interface IF_CRM_RUNTIME_BTIL is the interface for the Genil model node handler class under component BT (Business Transaction), i.e., CL_CRM_DOCSET_RUN_BTIL is the handler class for node BTDocSet.) As illustrated in FIG. 12, the attachment data for a specified business object may be obtained through the method GET_INFO of class CL_CRM_DOCUMENTS (which determines Documents for BOR Objects) (operation 1204). Then, for each document, the required attributes (described, for example, in data structure 900, e.g., CRMS_BO_DOCUMENTS_URI) of the attachment are set, in operation 1208, using the inputted object instance (which implements the interface IF_GENIL_CONTAINER_OBJECT, a standard interface defined in the Genil layer).

Figure 13:
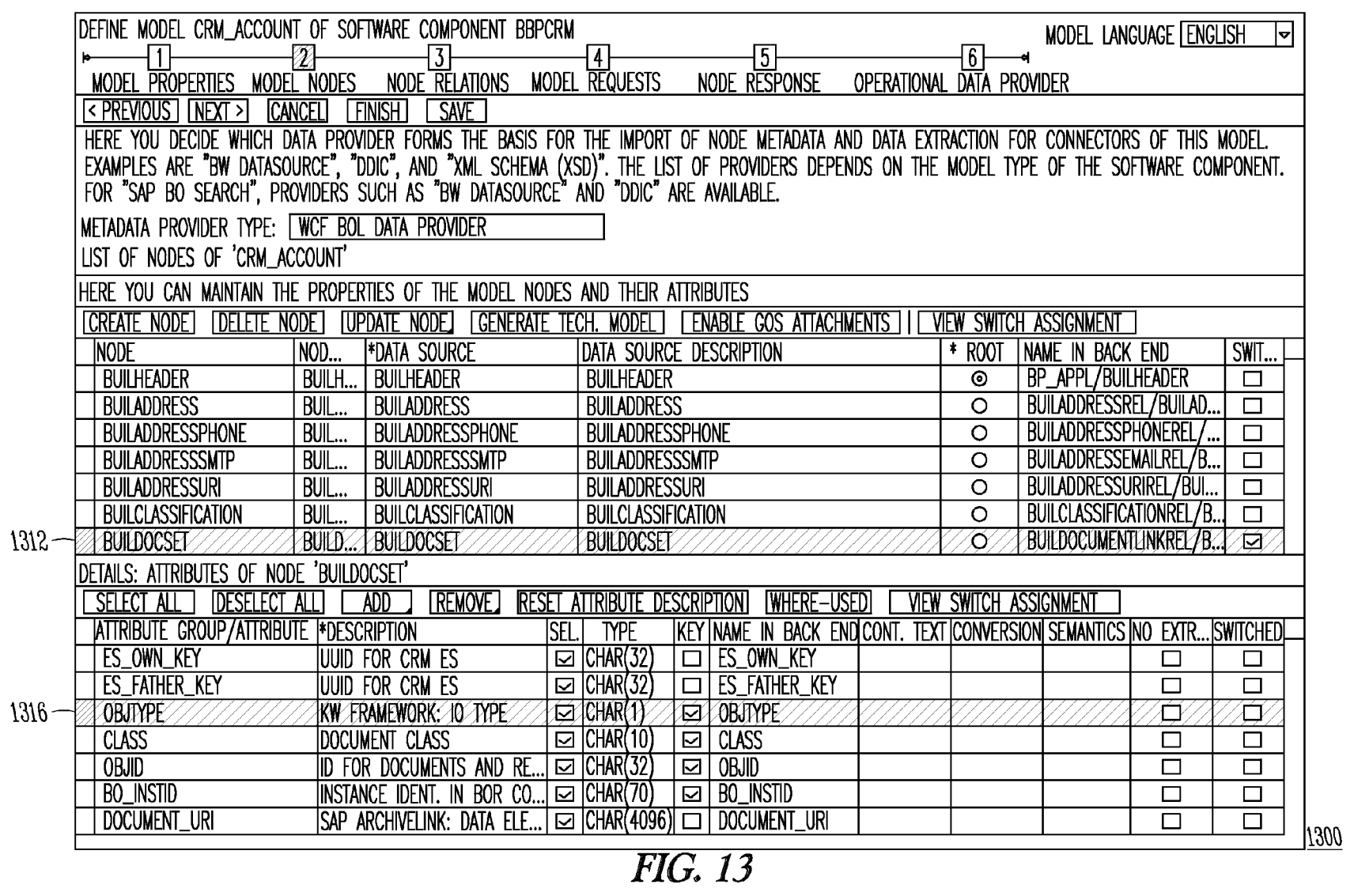
Figure 15:
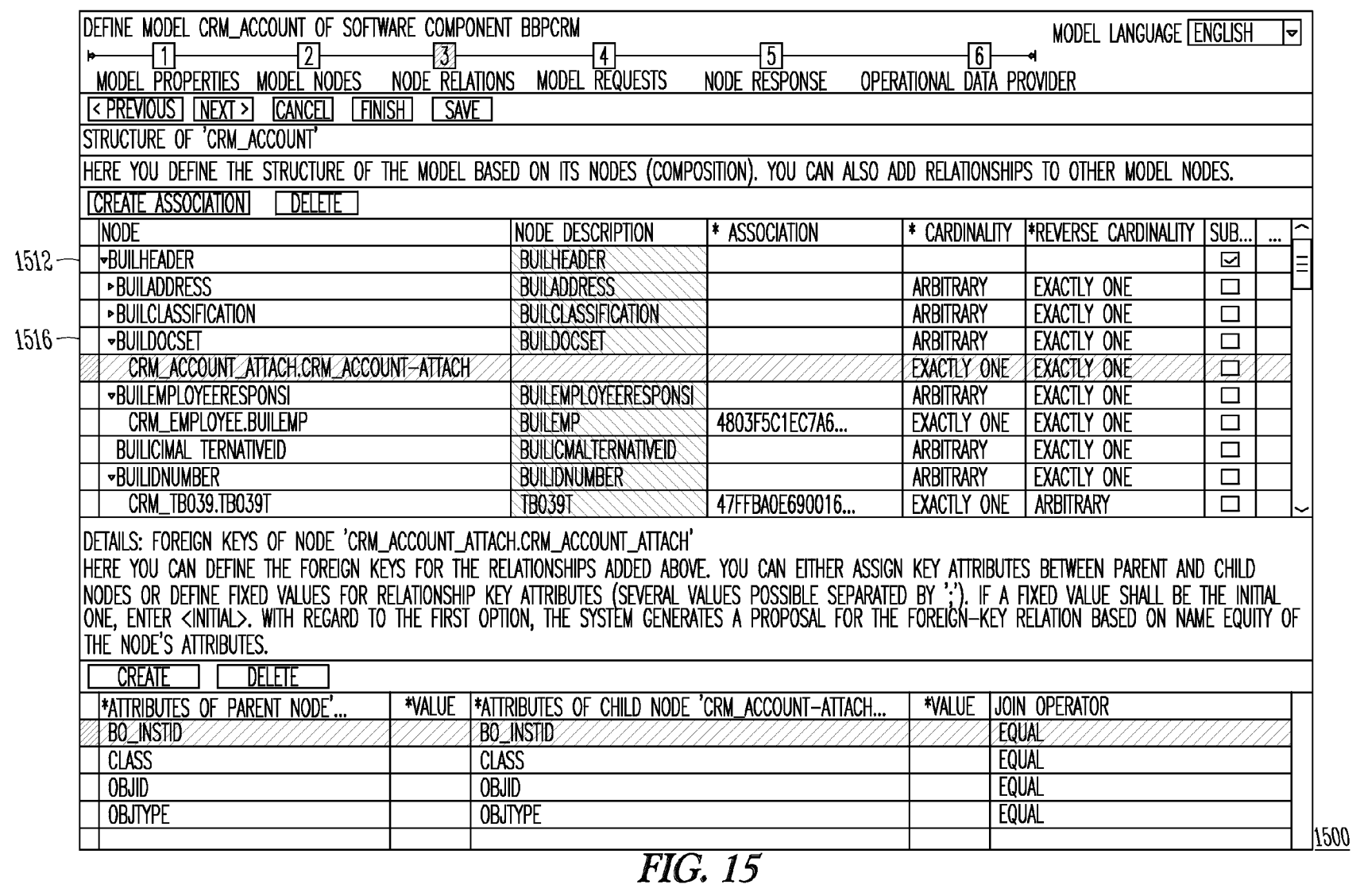

FIG. 13 illustrates an example enterprise search template 1300, in accordance with an example embodiment. The example enterprise search template 1300 includes the attachment dependent node 1312 described above. The screen shots of FIGS. 13-15 are based on the DocSet node for business object ACCOUNT. As illustrated in FIG. 13, all attributes are selected, but only attributes OBJTYPE 1316, CLASS, OBJID, and BO_INSTID are marked as keys.

FIG. 14 illustrates an example model structure 1400, in accordance with an example embodiment. As shown in FIG. 14, under the root object 1412, a new association (BuilHeader to BuilDocSet) is created with the join condition ES_OWN_KEY=ES_FATHER_KEY to link the parent node with the dependent node BuilDocSet 1004.

FIG. 15 illustrates an example model structure 1500 based on its nodes, in accordance with an example embodiment. As shown in FIG. 15, the relationship between the root node 1512 and the new dependent node 1516 (i.e., BuilDocSet) is defined.

It is important that the business objects in the CRM system described above are maintained and kept up-to-date. For example, if a related business object is modified, the enterprise search component 764 of the enterprise resource management system 760 should be notified of the changes so that the modified data can be indexed into the search engine 780. ABAP class CL_CRM_ES_MGR (the CRM ES Manager) provides the method NOTIFY_CHANGES which notifies the ES about the change pointer status of the CRM application and which can save the GUID of the changed business objects into an enterprise search change point database table. An enterprise search batch job may be executed in real-time or time period to retrieve the data of business objects in the change point table and submit them to the search engine 780 for indexing. The enterprise search batch job may be defined through an enterprise search connector.

When an attachment is created or modified for a business object, the system will not trigger a save of the business object (i.e., the activity of business object SAVE), but may trigger the SAVE of the GENIL component CM (the Generic interaction layer component model for Content Management), which manages the attachments for business objects. Therefore, the method NOTIFY_CHANGES of the business object will not be triggered and the attachments may not be properly indexed into the search engine 780. In one example embodiment, the trigger for notifying the change may be implemented by the GENIL component CM. The GENIL component CM may provide a business add-in (BADI) CRM_DOCUMENTS which may be triggered by a change(s) of a document(s) in the customer relationship manager system 840. (Note that a business add-in is a block of program at an enhancement spot of the ABAP program which can be called dynamically.) The BADI CRM_DOCUMENTS has the interface IF_EX_CRM_DOCUMENTS which may include only one method CARRY_OUT_ACTION (the interface method for interface IF_EX_CRM_DOCUMENTS). This method's interface provides the GUID of related business objects.

Therefore, an implementation (e.g., CRM_WRT_BO_ES_CHGPT, an implementation for BADI CRM_DOCUMENTS that is used to write a change pointer to the business objects which host the document) may be added to the BADI with one implementation class (e.g., CL_IM_CRM_WRT_BO_ES_CHGPT; the implementation class for implementation CRM_WRT_BO_ES_CHGPT that implements interface IF_EX_CRM_DOCUMENTS). In this implementation, the method CARRY_OUT_ACTION (an implemented method for implementation class CL_IM_CRM_WRT_BO_ES_CHGPT) shall call the method NOTIFY_CHANGES of class CL_CRM_ES_MGR with the GUID of the related business objects and their related information.

While the business objects for an attachment and the entity to which the attachment is attached may be searched utilizing the enterprise search template 1300 of FIG. 13, the matched attachments may not be capable of being returned with the search results because the cardinality between the business object and the attachment(s) may not be 1:0 . . . 1; it may be, for example, 1:0 . . . n. This may be a restriction of the search engine 780 and may mean that the retrieval of matching attachments is executed separately by creating another type of enterprise search template for attachments.

Figure 16A:
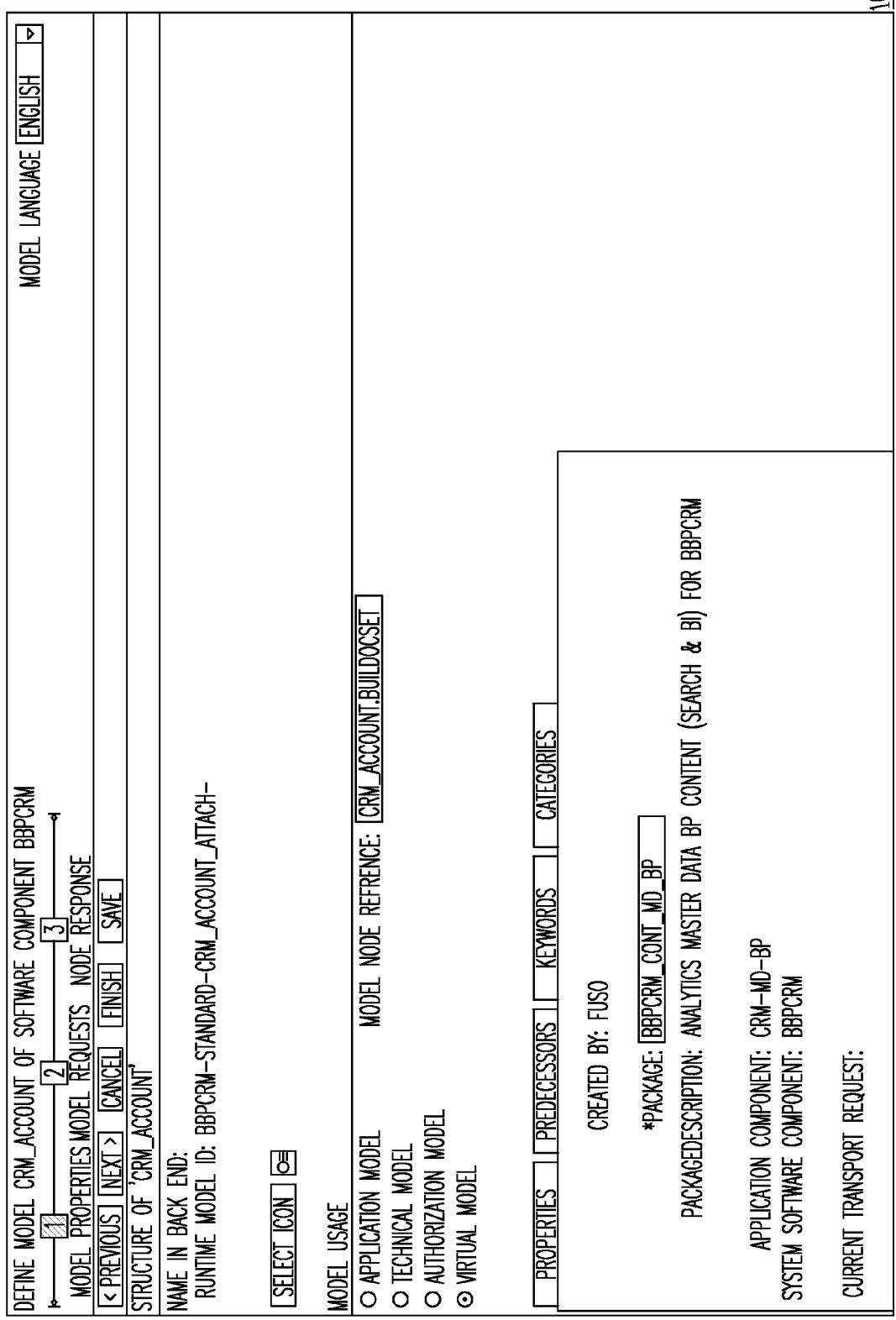
FIG. 16A illustrates an example attachment enterprise search template, in accordance with an example embodiment.

FIG. 16A illustrates an example attachment enterprise search template 1600, in accordance with an example embodiment. In the attachment enterprise search template 1600, the dependent node DocSet for attachments is marked as the root node. As illustrated in FIG. 16A, the header node of the business object shall be taken as a sub-node such that the identifier (for example, the business object's GUID in the header node) of the matching attachment with its related business object can be discovered in a search. To avoid indexing the business object data in the search engine 780 twice, the attachment enterprise search template 1600 is defined as a virtual template used for returning results and not for initiating a duplicated data indexing To define the attachment enterprise search template 1600, the model properties are defined as illustrated in FIG. 16A. It is important to define the model as a virtual model and to define the model node reference as the dependent node for an attachment.

Figure 16C:
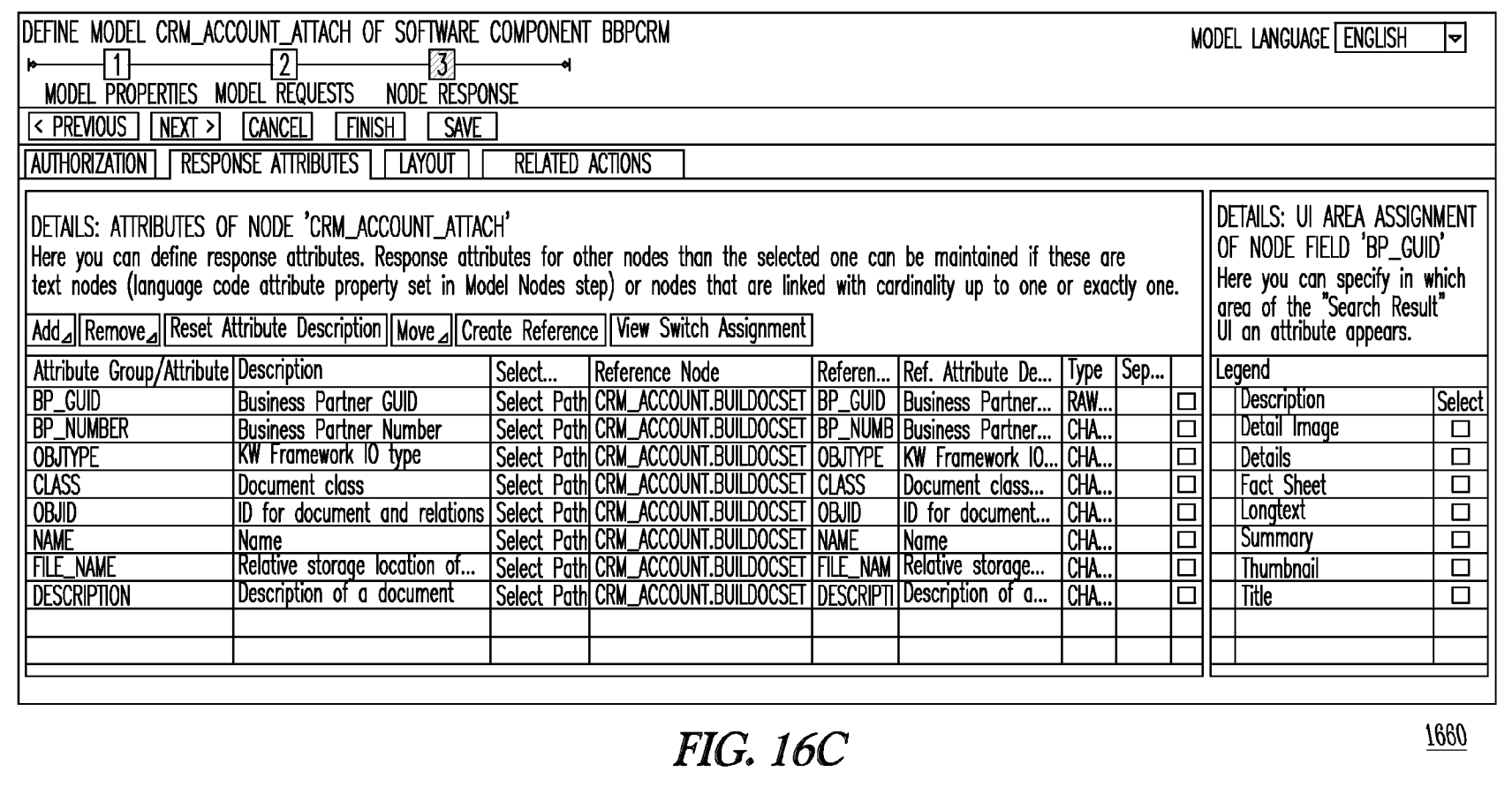

FIG. 16B illustrates an example definition 1612 of model requests, in accordance with an example embodiment. In one example embodiment, the model requests only the default node 1616 (the dependent node for attachments) and the following attributes may be marked for freestyle search: NAME 1620, FILE_NAME 1624, DESCRIPTION 1628 and DOC_CONTENT_URL 1632. FIG. 16C illustrates an example definition of node responses, in accordance with an example embodiment. The response attributes may be used for identifying the matching attachment to its related business object.

Figure 17:
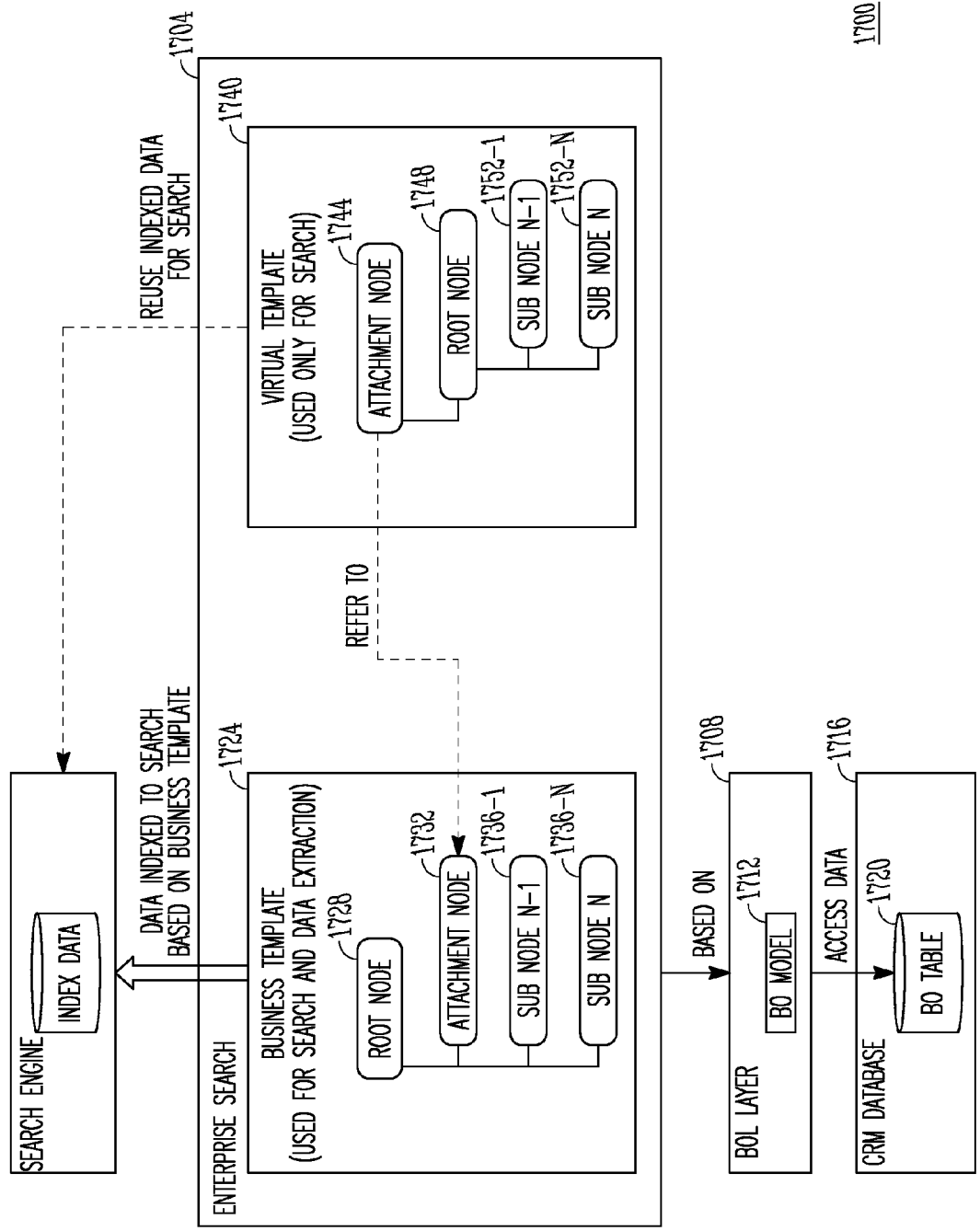
FIG. 17 illustrates an example relationship of the enterprise search template and the attachment enterprise search template, in accordance with an example embodiment.

FIG. 17 illustrates an example relationship 1700 of a version of the enterprise search template 1300 and a version of the attachment enterprise search template 1600, in accordance with an example embodiment. The version of the enterprise search template 1300 is business template 1724 and the version of the attachment enterprise search template 1600 is virtual template 1740. As illustrated in FIG. 17, an enterprise search 1704 is based on the business object model 1712 of the business object layer 1708. Data may be accessed via a business object table 1720 in a CRM database 1716.

In one example embodiment, the business template 1724 may comprise a root node 1728 containing the identifier of, for example, the entity to which an attachment is attached, an attachment sub-node 1732 that may contain an identifier of the attachment, and one or more sub-nodes 1736-1, 1736-N that may contain, for example, a description, a send date, content, and the like of the entity to which an attachment is attached.

In one example embodiment, the attachment business template 1740 may comprise an attachment node 1744 that is a root node of the attachment business template 1740 and refers to the corresponding attachment sub-node 1732, a root sub-node 1748 that contains an identifier of the entity to which the attachment is attached, and one or more sub-nodes 1752-1, 1752-N that may contain, for example, a description, a send date, content, and the like of the entity to which the attachment is attached (corresponding to sub-nodes 1736-1, 1736-N).

FIG. 18 illustrates an example database table registration 1800 of a defined attachment enterprise search template, in accordance with an example embodiment. The defined attachment enterprise search template 1600 may be registered in the database table WCFD_ES_BOL_Q (the table used to map enterprise search template 1300 to a BOL extraction query), as illustrated in FIG. 18. Since the defined attachment enterprise search template 1600 is a virtual template, it does not need to be used in indexing. Thus, the table fields BOL_QUERY and BOR_OBJ_TYPE may be left blank. (BOL_QUERY is the query used to extract data from a customer relationship management system for the search engine 780 for an object type specified by BOR_OBJ_TYPE.)

FIG. 19A illustrates an example attribute structure 1900, in accordance with an example embodiment. FIG. 19B illustrates an example result structure, in accordance with an example embodiment. The attribute structure in the package/1CRMES/ES_GEN_APPL (the package used to store the ES Genil query structure) and the result structure of the virtual template (illustrated in FIG. 19B) will be generated for use as a dynamic query object. For example, report CRM_ES_STRUC_GEN may generate the attribute structure and result structure of the virtual template.

Figure 20:
FIG. 20 illustrates an example dynamic query object, in accordance with an example embodiment.

FIG. 20 illustrates an example dynamic query object in the Generic interaction layer (Genil) component model for enterprise search (CRM_ES), in accordance with an example embodiment. After the enterprise search connector for the virtual template is created and activated, the dynamic query object may be automatically generated at runtime in the GENIL component CRM_ES and may be used to search for attachments. This functionality may be provided by a Web client UI framework.

Figure 21:
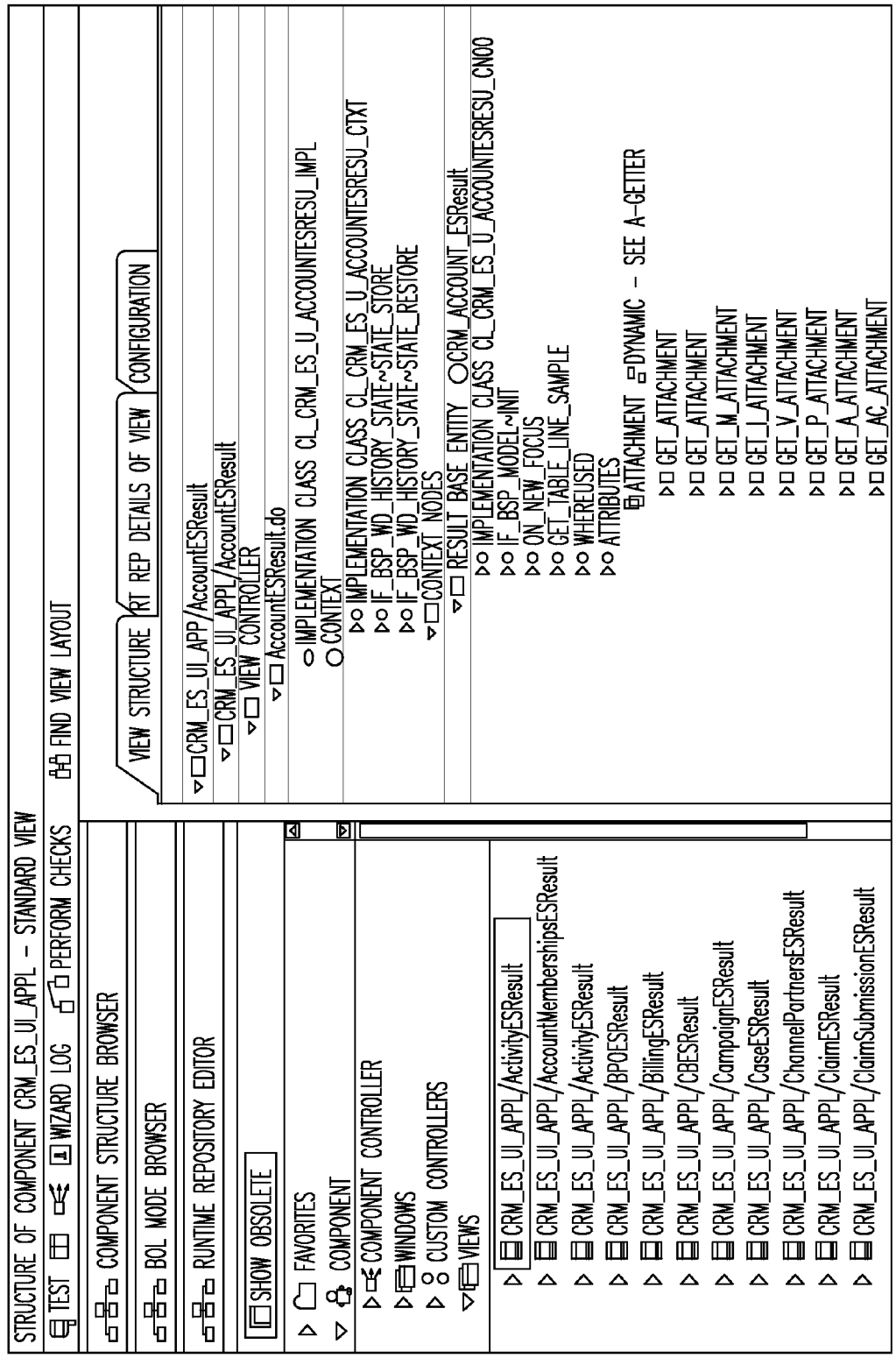
FIG. 21 illustrates an example user interface for viewing a search result, in accordance with an example embodiment.

FIG. 21 illustrates an example CRM User Interface (UI) component 2100 for generating a result view, in accordance with an example embodiment. The result list of a CRM enterprise search for a business object may be displayed in a view implemented in the CRM Web client UI framework. The various views may be collected in the CRM UI component CRM_ES_UI_APPL. For example, the view AccountESResult is the view for displaying accounts discovered in a search.

Figure 22:
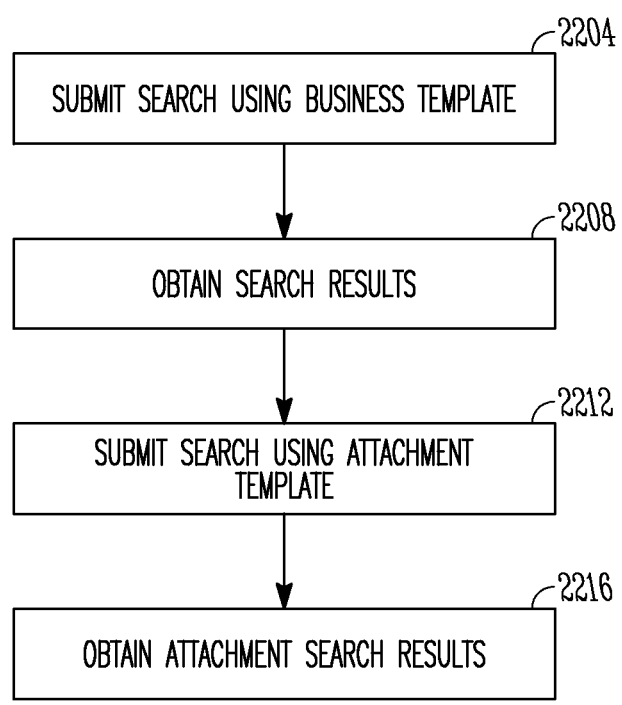
FIG. 22 illustrates an example method for searching data, in accordance with an example embodiment.

FIG. 22 illustrates an example method 2200 for searching data, in accordance with an example embodiment. In one example embodiment, a business template is used to submit a search to the search engine 780 via the enterprise resource management system 760 (operation 2204). Data for the business template (e.g., the URL of the attachment) may be obtained from the attachment business object and the business object of the entity to which the attachment is attached (e.g., the description, send date, content, and the like of the business object).

The results of the search may then be returned and obtained via the business template (operation 2208). For example, the search engine 780 may perform the search and return the results via the business template. The results do not include, however, attachments that may match the search query.

To obtain the attachment(s) that match the search query, a secondary search is conducted (operation 2212). The secondary search may be based on the generated query object from an attachment template (i.e., a virtual template) and may be triggered in the method GET_OCA_T_TABLE of the implementation class of the context node (a method for obtaining one-click-action (OCA) information for a table on a result view). To submit the secondary search, the following attributes may be set:

1) the attribute 'ALL_ATTRIBUTES_SEARCH_STRING' is set to the inputted search string (e.g., the search string submitted via the Web UI); and
2) the attribute for the GUID of the business object may be set (the name of this attribute is defined in the model requests of the virtual template and the value shall be all found business objects obtained in operation 2208).

The results of the secondary search may be obtained (operation 2216). From the results of the secondary search, a determination can be made whether a found business object has attachments that match the search query.

In one example embodiment, the symbol for attribute ATTACHMENT may be defined as a one-click-action. The one event OPENATTACH (corresponding to a user clicking the icons on the matched documents column in the result view) may be registered to it so that the matched attachments can be displayed. The method GET_P_ATTACHMENT may be redefined for this purpose (a method to get the property for the column "matched documents"). In one example embodiment, the attribute ATTACHMENT is not sorted or filtered.

In one example embodiment, event handler EH_OPENATTACH (an event handler called when the event OPENATTACH is triggered) may be implemented in the controller class of the result view and may enable the displaying of the list of attachments matching the search query.

As described above in conjunction with FIG. 6, the list of attachments matching the search query may be displayed, for example, in a pop-up window. In the CRM UI component GS_CMSRCH (a UI component defined for document search view), a view CMList for displaying attachments may be defined for displaying the search result document list. A window CMDisplayWindow (a popup window showing the matched documents list) and a view set CMDisplayVS (wrapped by window CMDisplayWindow to display the desired view) which includes only the view CMList may be added to the cited UI component. As view CMList was assigned to View Set CMSrchVS (the view set for search documents), the assignment to View Set CMDisplayVS may be performed dynamically via method DO_PREPARE_OUTPUT (a framework method that is called when any view is rendered) of the implementation class of view set CMDisplayVS. The view GS_CMSRCH/CMList (a view for displaying the search result document list) may enable the opening of an attachment in a new window by clicking the name of the attachment.

Figure 23:
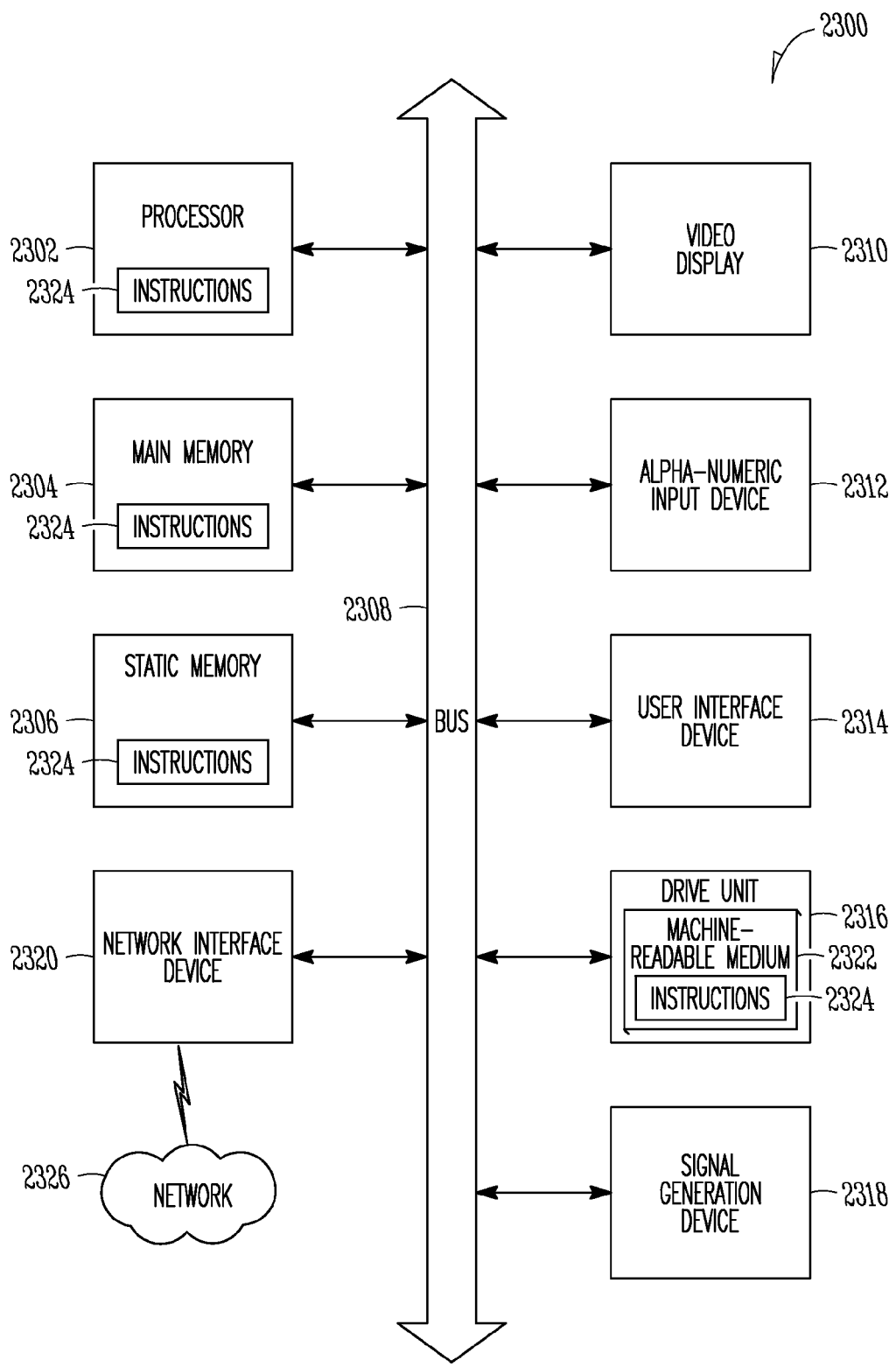
FIG. 23 is a block diagram of a computer processing system within which a set of instructions may be executed for causing the computer to perform any one or more of the methodologies discussed herein.

FIG. 23 is a block diagram of a computer processing system 2300 within which a set of instructions 2324 may be executed for causing the computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 2300 includes a processor 2302 (e.g., a central processing unit (CPU), a graphics processing unit (GPU) or both), a main memory 2304 and static memory 2306, which communicate with each other via a bus 2308. The computer processing system 2300 may further include a video display unit 2310 (e.g., a plasma display, a liquid crystal display (LCD) or a cathode ray tube (CRT)). The computer processing system 2300 also includes an alphanumeric input device 2312 (e.g., a keyboard), a user interface (UI) device 2314 (e.g., a mouse, touch screen, or the like), a drive unit 2316, a signal generation device 2318 (e.g., a speaker), and a network interface device 2320.

The drive unit 2316 includes machine-readable, tangible medium 2322 on which is stored one or more sets of instructions 2324 and data structures embodying or utilized by any one or more of the methodologies or functions described herein. The instructions 2324 may also reside, completely or at least partially, within the main memory 2304, static memory 2306, and/or within the processor 2302 during execution thereof by the computer processing system 2300, the main memory 2304, static memory 2306, and the processor 2302 also constituting machine-readable, tangible media 2322.

The instructions 2324 may further be transmitted or received over network 2326 via a network interface device 2320 utilizing any one of a number of well-known transfer protocols (e.g., Hypertext Transfer Protocol).

While the machine-readable, tangible medium 2322 is shown in an example embodiment to be a single medium, the term "machine-readable medium" should be taken to include a single medium or multiple media (e.g., a centralized or distributed database, and/or associated caches and servers) that store the one or more sets of instructions 2324. The term "machine-readable medium" shall also be taken to include any medium that is capable of storing, encoding or carrying a set of instructions 2324 for execution by the computer and that cause the computer to perform any one or more of the methodologies of the present application, or that is capable of storing, encoding or carrying data structures utilized by or associated with such a set of instructions 2324. The term "machine-readable medium" shall accordingly be taken to include, but not be limited to, solid-state memories, and optical and magnetic media.

While the embodiments of the invention(s) is (are) described with reference to various implementations and exploitations, it will be understood that these embodiments are illustrative and that the scope of the inventive subject matter is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the inventive subject matter.

What is claimed is:

1. A computerized method of searching, the method comprising:
    obtaining a search request conforming to a business template, the business template comprising a business template node containing an identity of an entity to which an attachment is attached and an attachment sub-node;
    performing a first search based on the search request conforming to the business template;
    obtaining a search request conforming to an attachment template, the attachment template comprising a root node referring to the attachment sub-node of the business template and an attachment template node containing an identity of the attachment;
    performing a second search based on the search request conforming to the attachment template, the second search comprising searching content of the attachment; and
    providing a result of the first search and the second search for display to a user.

2. The computerized method of claim 1, wherein the attachment template is a virtual template.

3. The computerized method of claim 1, wherein the attachment template defines attributes for searching the attachment.

4. The computerized method of claim 1, wherein the business template further comprises one or more nodes, each node containing one or more of a description, a send date, and content corresponding to the entity to which the attachment is attached.

5. The computerized method of claim 1, wherein the attachment template further comprises one or more nodes, each node containing one or more of a description, a send date, and the content of the attachment.

6. The computerized method of claim 1, further comprising indexing the entity to which the attachment is attached based on the business template.

7. The computerized method of claim 1, further comprising indexing the attachment based on the business template.

8. An apparatus, the apparatus comprising:
    a processor;
    memory to store instructions that, when executed by the processor, cause the processor to:
    obtain a search request conforming to a business template, the business template comprising a business template node containing an identity of an entity to which an attachment is attached and an attachment sub-node;
    perform a first search based on the search request conforming to the business template;
    obtain a search request conforming to an attachment template, the attachment template comprising a root node referring to the attachment sub-node of the business template and an attachment template node containing an identity of the attachment;

perform a second search based on the search request conforming to the attachment template, the second search comprising searching content of the attachment; and providing a result of the first search and the second search for display to a user.

9. The apparatus of claim 8, wherein the attachment template is a virtual template.

10. The apparatus of claim 8, wherein the attachment template defines attributes for searching the attachment.

11. The apparatus of claim 8, wherein the business template further comprises one or more nodes, each node containing one or more of a description, a send date, and content corresponding to the entity to which the attachment is attached.

12. The apparatus of claim 8, wherein the attachment template further comprises one or more nodes, each node containing one or more of a description, a send date, and the content of the attachment.

13. The apparatus of claim 8, further comprising instructions that, when executed by the processor, cause the processor to index the entity to which the attachment is attached based on the business template.

14. The apparatus of claim 8, further comprising instructions that, when executed by the processor, cause the processor to index the attachment based on the business template.

15. An apparatus, the apparatus comprising:
one or more processors;
memory to store instructions that, when executed by the one or more hardware processors perform operations comprising:
obtaining a search request conforming to a business template, the business template comprising a business template node containing an identity of an entity to which an attachment is attached and an attachment sub-node;
performing a first search based on the search request conforming to the business template;
obtaining a search request conforming to an attachment template, the attachment template comprising a root node referring to the attachment sub-node of the business template and an attachment template node containing an identity of the attachment;
performing a second search based on the search request conforming to the attachment template, the second search comprising searching content of the attachment; and
providing a result of the first search and the second search for display to a user.

16. The apparatus of claim 15, wherein the attachment template defines attributes for searching the attachment.

17. A non-transitory machine-readable storage medium comprising instructions that, when executed by one or more processors of a machine, cause the machine to perform operations comprising:
obtaining a search request conforming to a business template, the business template comprising a business template node containing an identity of an entity to which an attachment is attached and an attachment sub-node;
performing a first search based on the search request conforming to the business template;
obtaining a search request conforming to an attachment template, the attachment template comprising a root node referring to the attachment sub-node of the business template and an attachment template node containing an identity of the attachment;
performing a second search based on the search request conforming to the attachment template, the second search comprising searching content of the attachment; and
providing a result of the first search and the second search for display to a user.

18. The non-transitory machine-readable storage medium of claim 17, wherein the attachment template defines attributes for searching the attachment.

19. The non-transitory machine-readable storage medium of claim 17, further comprising instructions that, when executed by one or more processors of the machine, cause the machine to perform operations comprising indexing the entity to which the attachment is attached based on the business template.

20. The non-transitory machine-readable storage medium of claim 17, further comprising instructions that, when executed by one or more processors of the machine, cause the machine to perform operations comprising indexing the attachment based on the business template.

* * * * *